United States Patent [19]

Goldberg

[11] 4,253,145

[45] Feb. 24, 1981

[54] HARDWARE VIRTUALIZER FOR SUPPORTING RECURSIVE VIRTUAL COMPUTER SYSTEMS ON A HOST COMPUTER SYSTEM

[75] Inventor: Robert P. Goldberg, Newton Highlands, Mass.

[73] Assignee: Honeywell Information Systems Inc., Waltham, Mass.

[21] Appl. No.: 973,449

[22] Filed: Dec. 26, 1978

Related U.S. Application Data

[63] Continuation of Ser. No. 815,758, Jul. 14, 1977, abandoned, which is a continuation of Ser. No. 573,659, May 1, 1975, abandoned, which is a continuation of Ser. No. 365,795, May 31, 1973, abandoned.

[51] Int. Cl.³ .............................................. G06F 9/44
[52] U.S. Cl. .................................................. 364/200
[58] Field of Search ......................... 364/200 MS File

[56] References Cited

U.S. PATENT DOCUMENTS

| | | | |
|---|---|---|---|
| 3,412,382 | 11/1968 | Couleur et al. | 364/200 |
| 3,425,036 | 1/1969 | Packard | 364/200 |
| 3,461,434 | 8/1969 | Barton et al. | 364/200 |
| 3,546,677 | 12/1970 | Barton et al. | 364/200 |
| 3,614,745 | 9/1969 | Podvin et al. | 364/200 |
| 3,665,487 | 5/1972 | Campbell et al. | 364/200 |
| 3,766,533 | 10/1973 | Black et al. | 364/200 |
| 3,858,182 | 12/1974 | Delagi et al. | 364/200 |
| 3,955,180 | 5/1976 | Hirtle | 364/200 |
| 3,983,539 | 9/1976 | Faber et al. | 364/200 |
| 3,983,541 | 9/1976 | Faber et al. | 364/200 |

*Primary Examiner*—Harvey E. Springborn
*Attorney, Agent, or Firm*—Finnegan, Henderson, Farabow, Garrett & Dunner

[57] ABSTRACT

A hardware virtualizer establishes correspondence between the real process names of the processes executing on a general purpose host computer and the virtual resource names of virtual resources simulated within a plurality of reserved areas of memory of the host computer as duplicates of the real resources, the virtualizer including: (1) a register for controlling access to the individual virtual operating levels; (2) a φ-map for selectively associating process names with real resource names at the real level of operation, termed the 0 level; (3) an f-map for establishing correspondence between the names of virtual resources being simulated at various levels of virtual operation, termed level (n+1) through n and successively higher levels to level 1; and (4) a composer mechanism for combining information accessed from the φ-map and the f-map for establishing correspondence between the virtual resource names and the real resource names.

5 Claims, 17 Drawing Figures

HARDWARE VIRTUALIZER FOR SUPPORTING RECURSIVE VIRTUAL COMPUTER SYSTEMS ON A HOST COMPUTER SYSTEM

This is a continuation of application Ser. No. 815,758, filed July 14, 1977 (abandoned), a continuation of application Ser. No. 573,659, filed May 1, 1975 (abandoned), a continuation of application Ser. No. 365,795, filed May 31, 1973 (abandoned).

BACKGROUND

A. Field of the Invention

This invention relates generally to computer systems, and more particularly to a hardware virtualizer and method for establishing correspondence between virtual resources simulated on a general purpose host computer and real processes executing on the host computer.

B. Description of the Prior Art

The emergence in the early 1960's of I/O processors and the use of multiprogramming to improve resource utilization and overall performance signalled the beginning of multiprocessor multiprogramming configurations, wherein main memory was shared among non-identical processors, and wherein a single processor was shared by several processes that were competing for common resources.

In order to avoid problems relating to system integrity a dual state architecture was adopted. Basically system operation was separated into two distinct modes—privileged/non-privileged. The privileged/non-privileged mode of operation (also known as master/slave, supervisor/problem, or system/user modes) restricted the performance of critical operations to the privileged mode, whereas the bulk of operations which were non-critical were performed in the non-privileged mode. (See Computer Structures: Readings and Examples, by C. Gordon Bell and Allen Newell, Page 597, published in 1971 by McGraw-Hill, Inc.)

Referring to FIG. 1a, there is shown a portion of the conventional dual state architecture. The entire conventional dual state architecture is described in the above-cited Bell and Newell book and another book entitled, Computer Organization and the System/370, by Harry Katzan, Jr., published in 1971 by Van Nostrand Reinhold Company. For the understanding of the instant invention only that portion of the conventional dual state architecture shown in FIGS. 1a–1c need be discussed and considered herein. The bare machine 101 has a basic machine interface 103 which supports the privileged software nucleus 102. A basic machine interface is known in the art as the set of all software visible objects and instructions that are directly supported by the hardware and firmware of a particular system. This combination supports several extended machines 104, 105 etc., although only two are shown for clarity. The extended machines in turn can support several user programs such as 106 and 107.

Note, however, that since conventional systems of this type contain only one basic machine interface 103, they are capable of running only one privileged software nucleus 102 at any given time. Accordingly, since the only software which has complete access to and control of all functional capabilities of the hardware is the privileged software nucleus, several problems arise. Chief among these problems is in the area of program transportability, since non-privileged programs are actually written for the extended machine formed by the privileged software nucleus plus the non-privileged functions of the hardware.

Whereas the bare hardware machine is relatively easy the standardize, the extended machines are very difficult of standardization, because of the relative ease with which a system (including the privileged software nucleus) may be modified since the primitives (i.e. pseudo instructions) of such a system are in part implemented in software. A multiplicity of different extended machines running on a standard bare machine is the result. Therefore, a user desiring to run programs written for one extended machine, foreign to the user's extended machine, must either set aside some time on his extended machine to run the "foreign" software nucleus, or must convert the programs written for the foreign extended machine to his extended machine—a choice which most users do not relish.

Another problem arises because there is only one privileged software nucleus and, therefore, it is impossible to run two versions of the privileged software nucleus at the same time. Continued development and modification of the nucleus is, therefore, very difficult since it becomes necessary to have system programmers work at unusual hours to have the dedicated system at their disposal. Moreover, when system programmers do have the dedicated system at their disposal for debugging or modification purposes, a very light load is imposed on the system which results in inefficient utilization of resources.

Finally the amount of testing and diagnosis that can be performed without interfering with normal production schedules is limited, since diagnostic software must have access to and control of all the functional capabilities of the hardware, and thus, cannot be run simultaneously with the privileged software nucleus.

In order to avoid these problems, it is necessary to construct a virtual machine monitor VMM 122 on FIG. 1b, which can support several copies of the basic machine interface 124 on FIG. 1b rather than the extended machine interface. Then different privileged software nuclei, i.e., operating systems, 112, 113 on FIG. 1b, could be run on each of the additional basic machine interfaces 124 and the problems mentioned in the preceding paragraphs could be eliminated.

A basic machine interface which is not supported directly on a bare machine but is, instead, supported in a manner similar to an extended machine interface, is known as a virtual machine and is shown on FIG. 1b reference numerals 110, 111. (See Meyer, P. A. and Seawright, A Virtual Machine Time-Sharing System, IBM Systems Journal, 9, 3 (1970) pages 199–218, wherein the CP-67 virtual machine is described). Referring to FIG. 1b, there is shown the same bare machine 101 as in FIG. 1a; however, the privileged software now running on the basic machine interface 103 is now a virtual machine monitor (VMM) 122. The virtual machine monitor 122 now supports several copies of the basic machine interface 124. Accordinly a different privileged software nucleus 112, 113 can be run on each copy of the additional basic machine interface 124. Each privileged software nucleus 112, 113 can support its own set of extended machine interfaces 125 and 126 and, accordingly, its own user programs 118, 119 or 120, 121, respectively.

Since a basic machine interface, supported by a VMM, is functionally identical to the basic machine interface of the corresponding real machine, any privileged software nucleus which runs on the bare machine will run on the virtual machine as well. Moreover, the privileged software nucleus has no way of determining whether it is running on a bare machine or a virtual machine. Accordingly, a virtual machine is, in essence, equivalent to and functionally indistinguishable from its real counterpart.

The VMM does not perform instruction-by-instruction interpretation of these programs, but rather permits them to run directly on the bare machine for a greater part of the time. However, occasionally the VMM will trap certain instructions and execute them interpretively in order to insure the integrity of the system as a whole; after the interpretive phase is completed, control is returned to the executing program. Thus, program execution on a virtual machine is quite similar to program execution on an extended machine, with the majority of the instructions executing directly without software intervention, but with occasional intervention by the controlling software in order to perform a necessary interpretive operation.

It will be noted that the virtual machine monitor VMM 122 of FIG. 1b runs directly on a bare machine. Systems of this type have been referred to as a Type I virtual machine. However, there can be virtual machine monitors which run on extended machines. This type of virtual machine is shown schematically on FIG. 1c and is termed a Type II virtual machine. Referring to FIG. 1c, there is shown the bare machine 101 having a basic machine interface 103 with the privileged software nucleus 151. The privileged software nucleus 151, in turn, supports extended machines 153, 154, having extended machine interfaces 157a, 157b, respectively. Extended machine 153, in turn, supports user program 155, whereas extended machine 154 supports virtual machine 158, which in turn can, support extended machine 161 which can in turn, run a user program 162.

SOME PRIOR ART MACHINES

There are relatively few examples of virtual machines in the prior art. Some typical ones are as follows:

(a) IBM M44—Type I FV (Family-virtualizing)

The IBM M44, a highly modified second generation IBM 7044, was extended to include paging and a number of operational modes, such as Problem/Supervisor, Location Test/No Location Test, and Mapping/No Mapping. Through the use of an operating system, called MOS (Modular Operating System), it produced a set of virtual machines called 44X's. These 44X's are not virtual machines in the strictest sense since they are slightly different from real 7044's. A 44X operating system runs on each 44X and provides the customary services found on most operating systems. (See O'Neill, R. W., Experience Using a Time-Shared Multi-Programming System with Dynamic Address Translation, AFIPS 30, 1957; and also Parmelee, R. P., Peterson, R. I., Tillman, C. C. and Hatfield, D. J., Virtual Storage and Virtual Machine Concepts, IBM System Journal J.2, 1971, Pages 99–129).

(b) IBM Cambridge Scientific Center CP-40—Type I FV CP-40, the forerunner to CP-67, was constructed on an IBM 360/40 that was specially modified through the addition of an associative memory paging box. This system is a time-sharing system and supports fourteen virtual 360's. These 360's are standard IBM 360's and do not contain any of the special modifications of the host model 40. The virtual 360's are able to run numerous 360 operating systems, including the standard OS/360 and CMS, (a conversational system which was developed at Cambridge Scientific Center specifically for use with CP-40). The system suffered from the composite limitations of the 360/40's processor speed, a modest amount of real core, and a slow disk for paging. However, the CP-40 did serve to demonstrate the viability of the virtual machine notion. Furthermore, it provided a VMTSS, and with CMS, a convenient conversational system for the 360 at a time when no other general purpose timesharing system for that series of machines was working. Indeed, success with this project led directly to the larger system, CP-67. (See Lindquist, A. B., Seeber, R. R. and Comeaw, L. W., A-Time-Sharing System Using an Associative Memory, Proceedings IEEE 54, 12 December 1966, Pages 1774–1779).

(c) IBM Cambridge Scientific Center CP-67. Type I FV CP-67 was begun as an experimental system in conjunction with MIT Lincoln Laboratory in January, 1967. Initially, the CP-40 system was modified slightly to support the different memory relocation system found on the 360/67. Subsequently, the entire CP-67 system was rewritten. CP-67 is a VMTSS which runs on the 360/67 and supports between thirty and forty users. It is, by far, the most widely known virtual machine system. The virtual 360's produced under CP-67 have been very successful in running a number of different 360 operating systems. These include, but are not limited to, OS/360, in many versions, DOS, DOS-APL, CMS, LLMPS. The virtual machines have been used in telecommunications applications. The University of Grenoble has even run the IBM OS/ASP (Attached Support Processor) system, connecting a real 360/40 to a virtual IBM 360. The principal limitations of the virtual machines produced by CP-67 are that a small set of programs may not work correctly. These are:

(1) Programs which depend on precise execution times, (2) Programs which depend on the relationship between processing time and input/output time, (3) Programs which depend on precise real-time, and (4) Programs which contain self-modifying channel programs. The first two restrictions are identical with those to insure compatibility between two different member processors of the IBM 360 family. (See Meyer, P. A. and Seawright, L. H., A Virtual Machine Time-Sharing System, IBM Systems Journal, 9, 3, 1970, Pages 199–218; and Parmelee, R. P., Peterson, R. P., Tillman, C. C. and Hatfield, D. J., Virtual Storage and Virtual Machine Concepts, IBM Systems Journal, 2, 1972, Pages 99–129)

(d) Extension of CP-67 to support virtual 360/67—Type I SV In May, 1969, R. Goldberg designed a slight extension to CP-67 to support a relatively efficient software implementation of a virtual 360/67, with virtual relocation. With slight modifications, this design of a virtual 360/67 was implemented in the fall of 1969 by F. Furtek. Independently of this work, A. Auroux at the IBM Cambridge Scientific Center also designed a virtual 360/67 extension to CP-67. The two designs are very similar and the Auroux implementation has become part of the standard IBM distributed, CP-67 system.

The virtual 360/67 has been limited to a 24-bit addressing mode, single processor machine. With this capability, various 360/67 operating systems have been run, including CP-67 and TSS/360. That is, CP-67 has been run under itself. In fact, this chain has been tested to a depth of at least four. The principal additional limitation on the operation of the virtual 360/67 over a standard virtual 360, under a CP-67 is that programs that dynamically alter the contents of segment, or page, tables may not execute as intended. The results may, or may not, be identical with a real 360/67. In a real machine, the contents of the associative registers may affect the result and hence, results may also be unpredictable.

(e) Virtual 360 under UMMPS—Type II FV

The virtual 360 under UMMPS is a Type II virtual machine system. UMMPS is a conventional multiprogramming system which was written at the University of Michigan to run on a dual processor 360/67. The University of British Columbia has made a few modifications to UMMPS to support a virtual 360. These modifications have taken the form of some additional supervisor call facilities to perform some crucial operations in dispatching the virtual machine. Apparent exceptional conditions occurring in the virtual machine are reflected by the UMMPS supervisor back to a user program which performs, for example, the simulation of privileged instructions. Virtual (standard) 360's and now virtual 360/67's are supported by this system, although other user interfaces besides the virtual machine interface are provided (such as MTS or a conventional batch system). (Srodawa, R. J., Bates, D. A., An Efficient Virtual Machine Implementation, Proceedings ACM SIGARCH-SIGOPS, Workshop by Virtual Computer Systems, Cambridge, Mass., March, 1973).

(f) Japanese Electrotechnical Lab. HITAC-8400—Type II FV

The HITAC-8400 is the Japanese manufactured version of the RCA Spectra 70/45. It is a conventional third generation computer without a memory mapping system, similar to the IBM System/360. As an aid in debugging ETSS, a new time-sharing system for the HITAC-8400, a Type II virtual machine was constructed on the existing, vendor-supplied operating system, TOS/TDOS. The virtual machine system is very similar to the virtual 360 constructed on UMMPS. One interesting aspect of this effort was the attempt at simulating various virtual I/O devices that did not have exact physical counterparts (such as a display scope). This was done, of course, since the virtual machine was being used entirely to debug supervisory code for ETSS and not for running production jobs under it.

(g) Hardware Modified IBM 360/30—Type I FV

A virtual machine system has been constructed on an experimental 360/30 through a combination of software and ad hoc hardware, i.e. microprogramming modifications. These modifications, which have been introduced in order to simplify virtual machine construction, are used to implement a special "monitor" mode, and to relocate the interrupt control area from the regular control program area in physical page 0. The system is not a VMTSS and only supports one virtual machine. Furthermore, the system is not self-virtualizing and does not support virtual machines equivalent to this modified 360/30. Its principal use is in monitoring and evaluating the performance of existing operating systems, such as Operating System/360 (OS/360), and the Basic, Disk, and Tape Operating Systems (BOS, DOS, TOS/360).

(h) MIT Project MAC PDP-10 ITS—Type II SV HVM

It is not possible to implement virtual machines on the DEC PDP-10 using conventional third generation software techniques. Recently, R. P. Goldberg and S. W. Gallev have introduced the notion of a hybrid virtual machine for the PDP-10. With this technique, all executive-mode instructions are interpreted while all user-mode instructions execute directly. The MIT Project MAC Dynamic Modeling-Computer Graphics PDP-10 has provided an ideal environment for this implementation. The ITS (Incompatible Timesharing System) provides the requisite features to support a Type II (extended machine host) VCS. Furthermore, the hardware configuration is blessed with sufficient core and, at times, enough CPU cycles to make it possible to run the HVM. (See above-referenced Srodawa/Bates article).

(i) IBM VM/370

In August, 1972, IBM announced a virtual machine facility for various models of the IBM System/370. This system is a direct descendant of CP-67 supporting virtual machines using conventional software techniques. VM/370 is the first formally-supported, commercially-offered virtual machine system available from any manufacturer.

Early prior art virtual machines were characterized in the manner that the virtual machine monitors (VMM's) controlled the processor state, main memory and I/O operations of the virtual machine. Briefly, the early VMM's ran all programs in non-privileged mode, so that no privileged software nucleus, executing on a virtual machine, could enter privileged mode and gain unrestricted access to the entire system, thus having the capability of interferring with the VMM, itself, or any other virtual machine present in the system. Moreover, these early VMM's usually mapped main memory through paging techniques, and always performed all I/O operations interpretively. Therefore, these early virtual machines could only be implemented on computer systems with some form of relocation system having the capability to trap all instructions that could change, or query, the processor state or initiate I/O operations.

Although some of these early VMM's, e.g. CP-67, had to be implemented on paged computer systems, they could not themselves support paged virtual machines and, thus, could not be run on the virtual machines that they created. Because of this lack of recursive capability the VMM testing and development had to be carried out on a dedicated processor. In order to overcome this difficulty and to achieve a more satisfying degree of logical completeness, CP-67 was modified so that it could be run recursively. This required carrying out a double mapping operation efficiently to handle the additional paging operation which takes place in the VMM itself. Thus, in order to run a process on a paged virtual machine, a process generated address A must first be mapped into a virtual memory address A' by the virtual machine's page table, and then A' must be mapped into a real address A" by the VMM's page table. In order to carry out this double mapping efficiently, the VMM software constructs a composed page table, in which virtual process address A is mapped into real address A", and executes with this map controlling the address translation hardware.

When the VMM transfers a page out of memory, it must first change its own page table and then recompute the composed map. Similarly, if the privileged software nucleus changes the virtual machine's page table, the VMM must be notified so that the composed map can be recomputed. Since the virtual machine's page tables are stored in ordinary memory locations, instructions which reference the tables are not necessarily trapped by the VMM. Thus, changes could go undetected by the VMM, and proper operation could not be guaranteed.

Type II virtual machines, running on extended interfaces, are generally easier to construct than VMM's which run directly on a bare machine, because the VMM can utilize the extended machine's instruction repertoire when carrying out complex operations such as I/O. In addition, the VMM can take advantage of the extended machine's memory management facilities, which may include paging, and its file system.

Type II virtual machines have been constructed for the extended machine interface projected by the UMMPS operating system. As discussed previously, UMMPS runs on an IBM Model 67, and thus the VMM, which runs under UMMPS, is able to utilize the same processor state mapping that CP-67 does. However, the instruction in the VMM which initiates operation of a virtual machine must inform UMMPS that subsequent privileged instruction traps, generated by the virtual machine, should not be acted on directly but should instead by referred to the VMM for appropriate interpretation. Moreover, the instruction which initiates operation of a virtual machine also instructs UMMPS to alter its page tables to reflect the fact that a new address space has been activated. If the virtual machine being created is paged, it is then necessary to compose the resulting table with the page table that appears in the memory of the virtual machine. This latter operation is completely analogous to the creation of paged virtual machines under CP-67.

I/O operations in the original UMMPS Type II virtual machine were handled by having UMMPS transfer control to the VMM after trapping the instruction which initiated channel program execution. The VMM translated the channel program into its address space by applying the virtual machine's page map, if necessary, and then adding a constant relocation factor to each address. After performing this translation, the VMM called upon UMMPS to execute the channel program. UMMPS then absolutized the channel program and initiated its execution.

In addition to the overhead it entailed, this mapping procedure made it impossible for the virtual machine to execute a self-modifying channel program. A recent modification to the UMMPS virtual machine monitor software has been able to alleviate this situation. This modification involves positioning the virtual machine's memory in real memory so that the virtual address and the real address of each location are identical. This eliminates the need for channel program absolutization and thus improves efficiency while at the same time making self-modification of channel programs possible.

One of the difficulties that had to be overcome when making this change to the VMM was that the real counterparts of certain virtual machine memory locations were already being used by UMMPS. The solution that was adopted was to simply re-write the virtual machine's privileged software nucleus so that most of these locations were never used, because the software nucleus O/S was made to run on the virtual machine monitor VMM.

One of the more unusual proposed approaches to the problem of creating virtual machine architectures is based on the idea of eliminating privileged state entirely. The proponents of this approach argue that the primary, and in fact only essential, function of privileged state is to protect the processor's address mapping mechanism. If the address mapping mechanism were removed from the basic machine interface and, thereby, made totally invisible to software, there would be no need to protect the mechanism and, therefore, no need for privileged state.

The single state architecture discussed in the preceding section provides an efficient environment for the creation of recursive virtual machine systems. However, the basic machine interface associated with this architecture lacks a number of features which are useful when writing a privileged software nucleus. These features, which are present to varying degrees in several late third generation computer systems and will certainly be present in fourth generation systems, include descriptor based memory addressing multi-layered rings of protection and process synchronization primitives.

A recent analysis of virtual machine architectures for these more complex systems is based on an important distinction between two different types of faults. (U. O. Gagliardi and R. P. Goldberg—Virtualizable Architectures—Proceedings ACM AICA International Computing Symposium—Venice, Italy). The first type is associated with software visible features of a basic machine interface such as privilged/non-privileged status, address mapping tables, etc. These faults are handled by the privileged software nucleus which runs that interface. The second type of fault appears only in virtual machine systems and is generated when a process attempts to alter a resource map that the VMM is maintaining, or attempts to reference a resource which is available on a virtual machine but not the real system, e.g., a virtual machine memory location that is not in real memory. These faults are handled solely by the VMM and are completely invisible to the virtual machine itself. Faults caused by references to unavailable real resources were not clearly identified in this paper. The distinctions being drawn here are based on a later analysis by Goldberg. (Architectural Principles for Virtual Computer Systems—Phd. Thesis Division of Engineering and applied Physics—Harvard University, Cambridge, Mass.).

Since conventional architectures support only the former type of fault, conventional VMM's are forced to map both fault types onto a single mechanism. As already noted, this is done by running all virtual machine processes in non-privileged mode, directing all faults to the VMM, and having the VMM "reflect" all faults of the first type back to the privileged software nucleus of the virtual machine. An obvious improvement to this situation can be realized by creating an architecture which recognizes and supports both types of faults.

While relatively few machine systems have been constructed on contemporary computer systems, the majority of today's computer systems do not and cannot support virtual machines. The few virtual machines currently operational, e.g. CP-67, utilize awkward and inadequate techniques because of unsuitable architecture. Where computer architectures, specifically designed for virtual machines, have been proposed, they have suffered from two basic weaknesses. Either they have been unable to support modern complex operating systems directly on the virtual machines, or they have been unable to avoid all of the traditional awkwardness and overhead of significant software intervention associated with virtual machine support.

What is needed is a virtual machine design that can be implemented on an existing conventional computer system, or on "fourth generation" computer systems, which include descriptor-based memory addressing, multi-layered rings of protection and process synchronization primitives such as semaphores, etc. Moreover, such a virtual machine design should be capable of implementation by making only a relatively small number of hardware/firmware modifications.

(The above discussion adapted and/or excerpted in part by permission from a pre-publication paper by J. P. Buzen and U. O. Gagliardi "The Evolution of Virtual Machine Architecture" and from a PhD thesis by Robert P. Goldberg "Architecture Principles for Virtual Computer Systems" Division of Engineering and Applied Physics—Harvard University, Cambridge, Mass.).

SUMMARY OF THE INVENTION

It is a primary object of the invention to provide an improved mapping mechanism for virtual computer resources being simulated on a general purpose host computer This and other objects of the invention will become apparent from the description of a preferred embodiment of the invention when read in conjunction with the drawings contained herewith.

The object of the invention is attained in a real host computer having real resources with real resource names (i.e., typically at least one processor, at least one main memory, at least one I/O map, etc.) and having real processes having real process names, the real processes executing on the host computer, and further having virtual resources with virtual resource names, the virtual resources being simulated duplicates of the typical real resources within a plurality of reserved areas of memory of the general purpose host computer, wherein a hardware virtualizer establishes correspondence between the real process names of the processes executing on the general purpose host computer and the virtual resource names of the virtual resources within any one of the plurality of reserved memory areas, the hardware virtualizer including a $\phi$-map portion selectively associating real process names with real resource names at a real level of operation, an f-map establishing correspondence between virtual resource names of virtual resources being simulated at different levels of virtual operation, and a composer mechanism combining the $\phi$-map and the f-map for establishing correspondence between the real processes executing on the general purpose host computer and the virtual resources being simulated on the general purpose host computer.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by references to the following description taken in conjunction with the drawings in which:

GENERAL DISCUSSION

A. Introduction

Figure 1B:
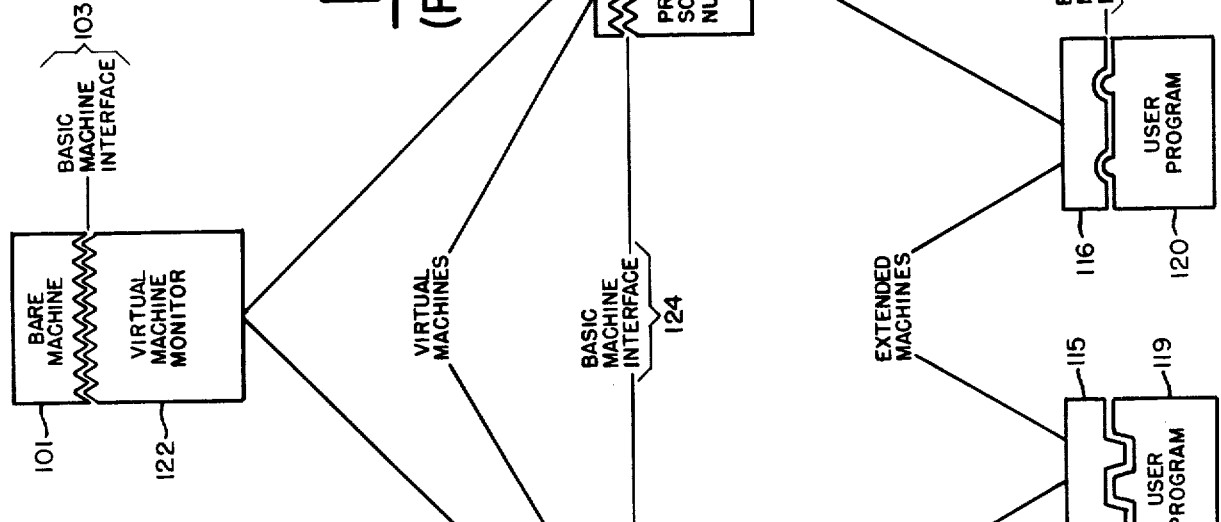
FIG. 1a-1c are prior art block diagrams useful in helping to delineate the invention relative to the prior art and to provide a background of prior art to better understand the invention.
Figure 1A:
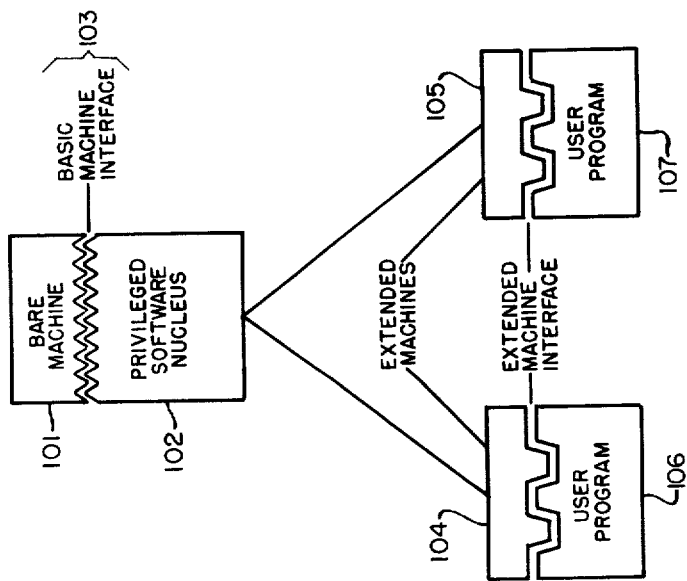

Because the concepts of virtual computer systems are just beginning to emerge over the "electronic computer system horizon", and are well understood by a relatively few sophisticated persons in the computer art, and in order to better teach the instant invention so that it may be readily practiced by persons of ordinary skill in the computer art, it was deemed advisable to review prior art concepts in some detail. To gain full appreciation of the teachings of the instant invention, however, it is considered helpful to further pave the way to a description of a preferred embodiment by developing a model of the invention which represents the mapping and addressing of resources by a process executing on a virtual computer, hereafter referred to, as known in the art, as a virtual machine.

Moreover, in order to derive the underlying architectural principles of virtual machines, a model that represents the execution of a process on a virtual machine is desirable. Since it is desired that these principles be applicable to the complete range of conventional computer systems—from minicomputers, through current general purpose third generation systems, and including certain future (possibly fourth generation) machines—it is necessary to produce a model which reflects the common points of all of these systems. The model should not depend on the particular map structures visible to the software of the machine under discussion. Features such as memory relocation or supervisor state are characteristics of the existing system and occur whether or not virtual machines are being discussed.

To introduce virtual machines, a different, independent mapping structure is defined which captures the notions common to all virtual computer systems. The unifying theme is the concept of a virtual machine configuration and a set of virtual resources. These resources, e.g., the amount of main memory in the virtual machine, are a feature of all virtual machines regardless of the particular virtual processor's form of memory relocation, etc. Thus, the key point is the relationship between the resources in the configuration of the virtual machine and those in the configuration of the real (host) machine. Only after this relationship has been fully understood need the complexities introduced by the existence of any additional mapping structure be treated.

B. The Resource Map

A model of virtual machine resource mapping is developed by defining the set of resources $V=(v_o, v_1, \ldots, v_m)$ present in the virtual machine configuration, and the set of resources $R=(r_o, r_1, \ldots, r_n)$ present in the real (host) configuration. Resource spaces, both real and virtual, are always represented as squares in the figures. The sets V and R contain all main memory names, addressable processor registers, I/O devices, etc. However, in the discussion which follows, for simplicity, all resource names are treated as if they are memory names i.e. addresses. Since memory locations can be used to reference other resource names such as processor registers, e.g., DEC PDP-10, or I/O devices, e.g., DEC PDP-11, no generality is lost by treating all resource names as memory names.

Since no a priori correspondence between virtual and real names is assumed, a way of associating virtual names with real names during execution of the virtual machine must be incorporated. To this end, a function is defined for each moment of time:

$$f: V \to R \cup \{t\}$$

Where f is the resource map for the set V of virtual resources to the set R untion t, where R is the set of real resources of the system and t is the event that indicates a trap or fault has occurred, such that if $y \in V$ and $z \in R$ Where $y \in V$ indicates y is an element of the set V and $z \in R$ indicates z is an element of the set R (i.e. y is a virtual resource and z is a real resource), then in order to associate the elements of one set with the elements of another set, $$f(y) = \begin{cases} z \text{ if z is the real name for virtual name y} \\ t \text{ if y does not have a corresponding real name} \end{cases}$$

i.e. f(y) is equal to z, if z is the real resource that corresponds to virtual resource y, otherwise f(y) equals t if y does not have a corresponding real resource assigned to it at a particular point in time.

The value f(y)=t causes a trap or fault to be referred to some fault handling procedure in the machine whose resource set is R, i.e., the machine R. For clarity this event will be termed herein a VM fault, not an exception.

The function f is called a resource map, virtual machine map, or f-map. The software on the real machine R which sets up the f-map and normally receives control on a VM-fault is called the virtual machine monitor (VMM).

The model imposes no requirement that the f-map be a page map, relocation-bounds (R-B) map, or be of any other form. However, when speaking of virtual machines, our attention is normally restricted to those cases where both the virtual machine is a faithful replica of the real machine and the performance of the virtual system can be made comparable to the real one.

C. Recursion

The resource map model developed above extends directly to recursion by interpreting V and R as two adjacent levels of virtual resources. Then the real physical machine is level 0 and the f-map maps level n+1 to level n.

Recursion for virtual systems is a capability of considerable practical interest. In its simplest form, the motivation for virtual machine recursion is that although it makes sense to run conventional operating systems on the virtual machine, in order to test the VMM software on a VM, it is also necessary to be able to run at least a second level virtual machine.

If virtualization is not recursive, one can only generate one nesting level of virtual machines; therefore, it is impossible to debug the software that handles the virtual mode exceptions (virtual machine monitor, VMM) while maintaining regular service on the system. In fact, in order to debug the VMM in concurrence with other activities, it is necessary that one of the virtualmachines be allowed, in turn, to run a VMH generating, thus a second level of virtual machines. From a practical point of view all that is needed is a limited recursion capability with two levels of nesting for the virtual machines. This minimum capability would permit the VMM software to be debugged in concurrence with other activities on the system.

In the discussion which follows, a PL/I-style qualified name, tree-naming convention is used in which a virtual machine at level n has n syllables in its name.

Figure 1D:
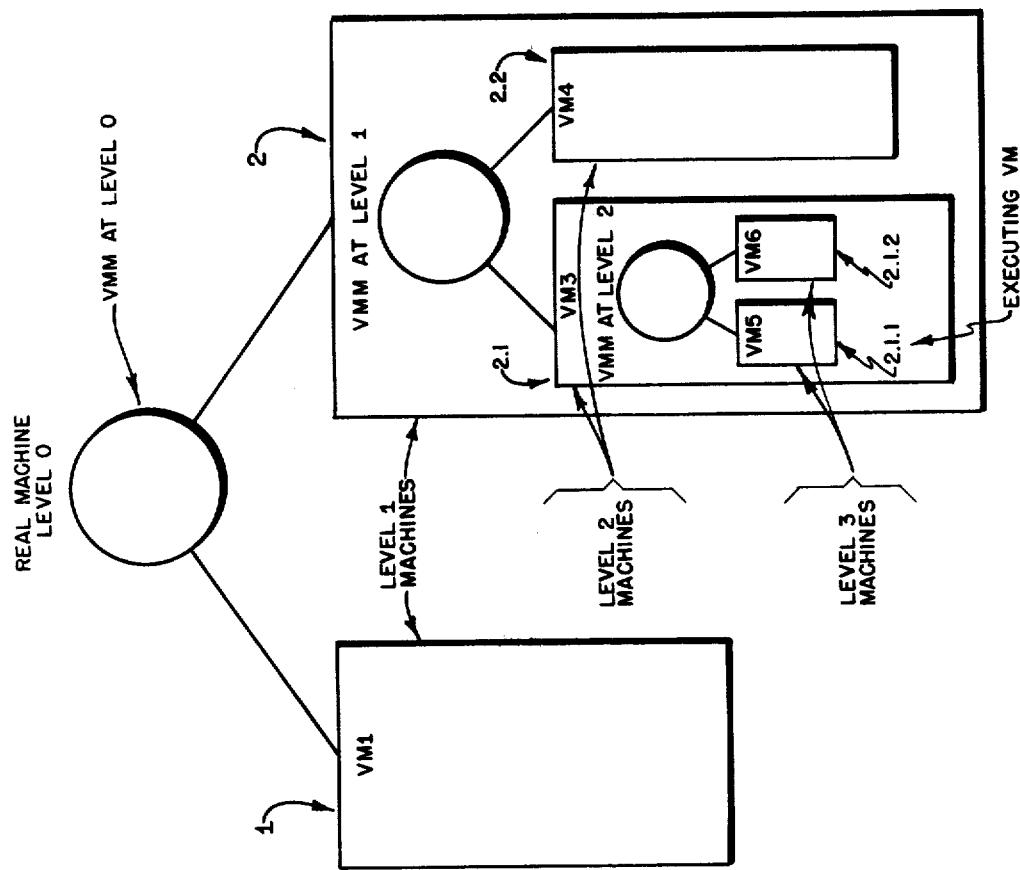
FIGS. 1d, and 2a-2d are schematic block diagrams illustrating the recursive f-map process of the invention.
Figure 1C:
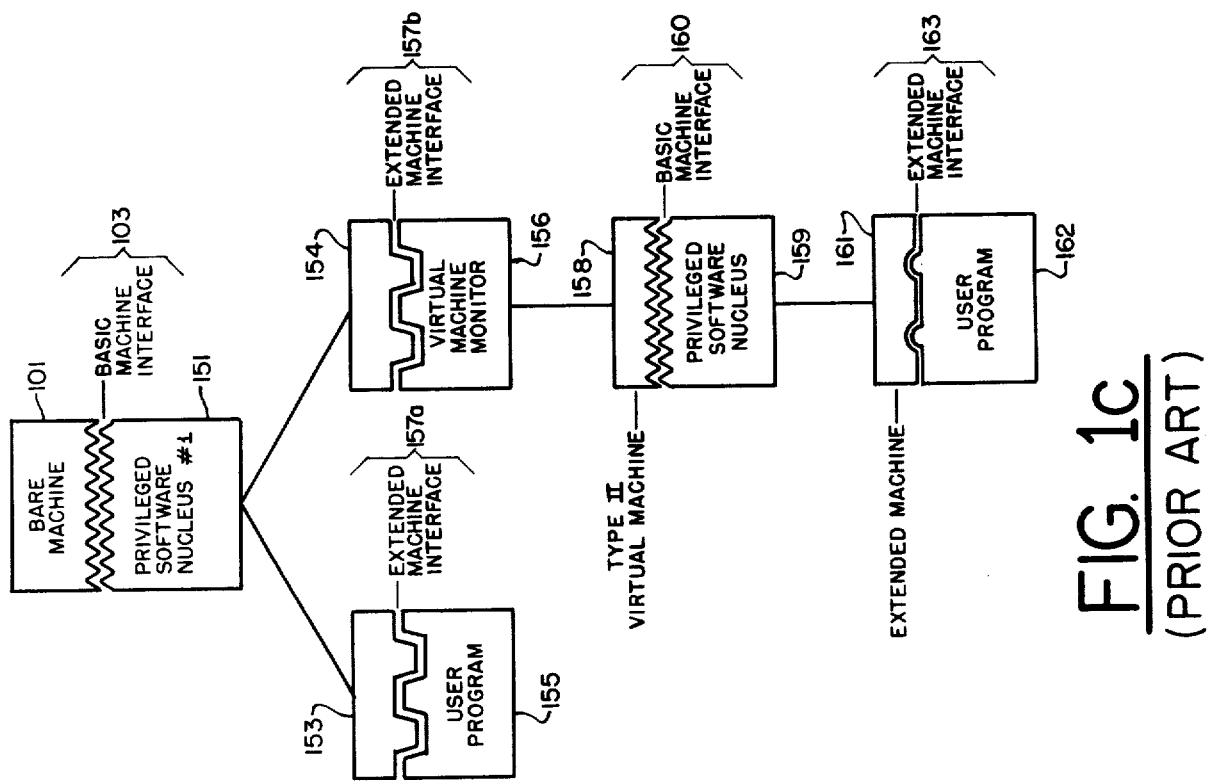

Referring to FIG. 1d there is shown a schematic representation of the virtual machine of the invention having recursive capability. On the real machine at level 0 is a VMM. There are two virtual machines (VM's) at level 1—VM1 and VM2. VM1 has a tree name 1, and VM2 has a tree name 2. There are two VM's at level 2—VM3 and VM4. VM3 has a tree name 2.1, and VM4 has a tree name 2.2, etc. In FIG. 1d the executing VM is 2.1.1—three levels down from the 0 level. It can be seen that there are n syllables in the name of the virtual machine at level n, and accordingly there is an implication that n maps have to be composed together in order to actually take the resource from level n in the virtual machine into the real machine. This naming convention uniquely names the ancestors of the executing VM and in particular its parent. Thus, if the executing VM generates a virtual machine fault, the hardware/firmware can conclude that control must be transferred to, say, the VMM running on 2.1 VM which is the parent of the executing VM 2.1.1.

This tree-name is used as a subscript for both the virtual resource space, e.g., $V_{1.1}$, and corresponding f-map, e.g., $f_{1.1}$.

Thus, if $f_1:V_1 \to R$ (level 1 resource map for mapping $V_1$ to R)

$f_{1.1}:V_{1.1} \to V_1$ (level 2 resource map for mapping $V_{1.1}$ to $V_1$).

Figure 2A:
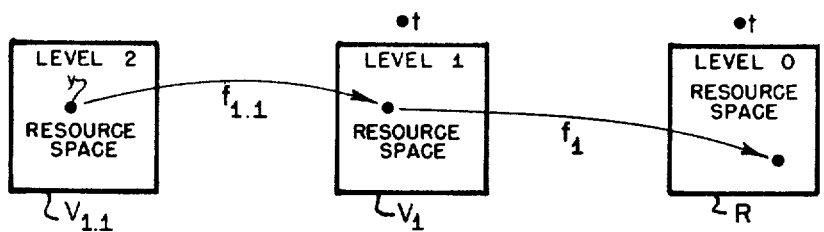

Then a level 2 virtual resource name y is mapped into $f_2$ $(f_{1.1}(y))$ or $f_1 \circ f_{1.1}(y)$.* See FIG. 2a.

*"$\circ$" is the conventional function composition operator of mathematics.

The above map and FIG. 2a both illustrate how two virtual machine maps $f_1$ and $f_{1.1}$ are composed (put together) in order to map from level 2 to level 1 to level 0, i.e. the real machine. As f-map has been previously defined, a virtual resource can be mapped into a real resource, or a virtual resource into a different level, or it can cause a fault. FIG. 2a shows the successful mapping (i.e., without a fault) or a virtual machine resource at virtual machine $V_{1.1}$ into virtual machine $V_1$, into a real machine R, i.e., $f_1(f_{1.1}(z))$.

In the above function, $f_1 \circ f_{1.1}$, we also identify two possible faults:

(1) The level 2 resource (virtual machine) fault to the VMM of level 1, i.e., $f_{1.1}(v)=t$. See FIG. 2b.

(2)The level 1 resource (virtual machine) fault to the VMM of level 0 (the real machine), i.e., $f_1 \circ f_{1.1}(v)=t$. See FIG. 2c.

Figure 2B:
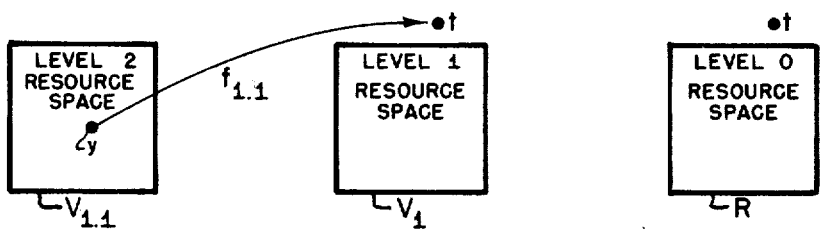
Figure 2C:
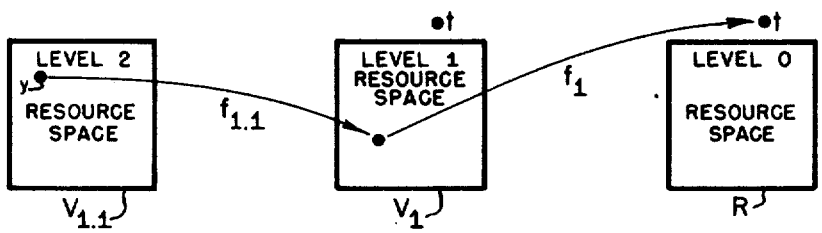

FIG. 2b illustrates a fault occurring because the resource being mapped from virtual resource space $V_{1,1}$, where it exists, to virtual resource space $V_1$ is non-existent in $V_1$, e.g., a page existing in $V_{1,1}$ is not in $V_1$. Accordingly a fault t results. This is the type (1) fault, i.e., level 2 fault, above $f_{1,1}(y)=t$. FIG. 2c illustrates the type (2) fault (level 1 fault) above, where a resource existing in virtual space $V_{1,1}$ is successfully mapped into virtual resource space $V_1$ but, thereafter, fails to be mapped into the real resource space R.

In the type (1) fault above, a feature of the invention, to be more fully described infra, causes control in the type (1) fault to pass directly to the virtual machine monitor VMM running on $V_1$, without the knowledge of the virtual machine monitor running on the real machine R—an innovation of major significance. Similarly, where the map $f_{1,1}$ is successful in mapping $V_1$, i.e., finds a corresponding resource in $V_1$, but map $f_1$ fails to map to R, i.e., does not find a corresponding resource in R, then the fault t causes control to pass to the virtual machine monitor running on the real machine, without the knowledge of the VMM running on $V_1$.

In prior art virtual machines, such as CP-67, where implementation of recursion was attempted, if a fault occurs at level 1, for example, the fault would be handled by being referred to level 0, since there is no real fault handling mechanism, and then reflected back by software to level 1, thus entailing much software overhead.

In general, a composed f-map may cause either fault. However, there exists a class of maps, called inclusive maps, which can only cause the first fault (level 2 fault). The relocation-bounds map (R-B map) is inclusive but the page map is not. The inclusive property implies the possibility of simple recursive implementation.

For the general case of level n recursion, we have n-level virtual name y being mapped into $$f_1 \circ f_{1,1} \circ \ldots \circ f_1 \ldots _1(v).$$

Figure 2D:
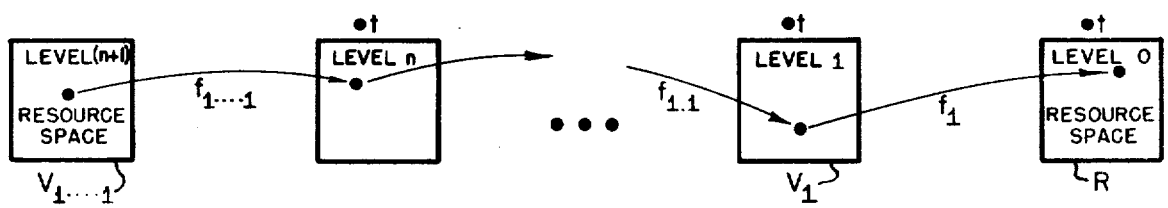

See FIG. 2d.

The present model can be used to describe the single state recursive virtual machines. See Table I (infra).

D. The Process Map $\phi$

The model, as currently developed, represents only the mapping of resources in a computer system. This machinery is sufficient to discuss virtualization of certain minicomputers, e.g., DEC PDP-8, which do not exhibit any local mapping structure. However, most current (third generation) general purpose systems have additional software-visible hardware maps. This additional structure may be as simple as supervisor/problem states (IBM System/360) and relocation-bounds registers (DEC PDP-10 and Honeywell 6000), or as complex as segmentation-paging-rings. In future fourth generation systems, the maps will likely be even more complex and might feature a formal implementation of the process model in hardware/firmware.

The crucial point about each of these hardware supported maps is that they are software visible. In certain systems, the visibility extends to non-privileged software. However, in all cases the maps are visible to privileged software.

Typically, an operating system on one of these machines will alter the map information before dispatching a user process. The map modification might be as simple as setting the processor mode to problem state or might be as complex as changing the process's address space by switching its segment table. In either case, however, the subsequent execution of the process, and access to resources by it, will be effected by the current local map.

Therefore, in order to faithfully model the running of processes on a virtual machine, we must introduce the local mapping structure into the model.

A model of the software-visible hardware map is developed by defining the set of process names $P=(p_0, p_1, \ldots, p_j)$ to be the set of names addressable by a process executing on the computer system. Process spaces are represented as circles in FIGS. 3a and 3b. Let $R=(r_0, r_1, \ldots, r_n)$ be the set of (real) resource names, as before.

Then, for the active process, a way is provided for associating process names with resource names during process execution. To this end, via all of the software visible hardware mapping structure, e.g., supervisor/problem state, segment table, etc., a function is defined for each moment of time, $$\phi: P \rightarrow R \cup \{e\}$$

where $\phi$ is the operating system visible software map for the set P of process names to the set R union e, where R is the set of real resources of the system and e is the event that indicates an exception has occurred. such that if $x \in P$, $y \in R$, then where $x \in P$ indicates x is an element of the set P of processes and $y \in R$ indicates y is an element of the set R, i.e., they are resources, then in order to associate the elements of one set with the elements of another set, $$\phi(x) = \begin{cases} y \text{ if y is the resource name for process name x} \\ e \text{ if x does not have a corresponding resource} \end{cases}$$

i.e. $\phi(x)$ is equal to y, if y is the real resource that corresponds to the process name x, otherwise $\phi(x)$ equals e if x does not have a corresponding real resource assigned to it at a particular point in time.

The value $\phi(x)=e$ causes an exception to occur to some exception handling procedure, presumably to a privileged procedure of the operating system on this machine. To avoid confusion with VM-faults (see above), process traps will always be called exceptions.

The function $\phi$ is called a process map or $\phi$-map. The term process map is applied regardless of what form the $\phi$-map takes. In future (fourth generation) systems, $\phi$ might actually represent the firmware implementation of processes, although this is not necessary. The important point about $\phi$ is that unlike f, which is an inter-level map, $\phi$ is a local or intra-level map and does not cross a level of resource mapping.

E. Running a Virtual Machine: f o $\phi$

Running a process on a virtual machine means running a process on a configuration with virtual resources. Thus, if a process $P=(p_0, p_1, \ldots, p_j)$ runs on the virtual machine, $V=(v_0, v_1, \ldots, v_m)$ then $$\phi: P \rightarrow V \cup \{e\}$$

as before, with virtual resource names, V, substituted for real ones in the resource range of the map.

The virtual resource names, in turn, are mapped into their real equivalents by the map, $f: V \rightarrow R$. Thus, a process name x corresponds to a real resource $f(\phi(x))$. In general, process names are mapped into real resource names under the composed map $$f \circ \phi: P \rightarrow R \cup \{t\} \cup e,$$

where symbols are defined as before.

This composed map can fail to take a process name into a real resource name in one of two ways. In the event of a process name exception (FIG. 3a), control is given, without VMM knowledge or intervention, to the privileged software of the operating system within the same level. A virtual name fault, however, causes control to pass to a process in a higher level virtual machine, without the operating system's knowledge or intervention (FIG. 3b). While this fault-handling software in the VMM is not subject to an f-map, since it is running on the real machine, it is subject to its $\phi$-map just as any other process on the machine.

Figure 3A:
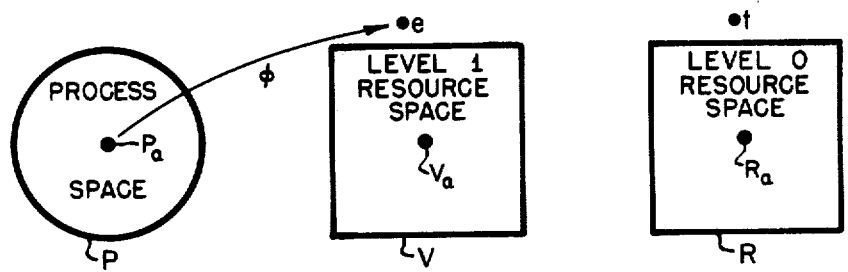
FIGS. 3a and 3b are schematic block and circle diagrams illustrating the process exception and VM-fault generation of the invention.
Figure 3B:
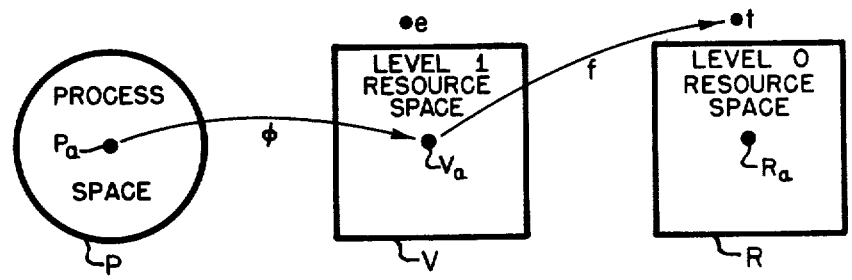

Referring to FIGS. 3a and 3b there are shown process spaces P represented by circles and virtual and real resource spaces V and R, respectively, represented by squares. For valid mapping to occur, a process name $P_a$ in process space P is taken into a point $V_a$ in virtual resource space V, and finally into a point $R_a$ in real resource space R. However, FIG. 3a shows an exception e occurring in virtual space V wherein control remains in virtual machine operating in virtual space V. The exception is passed to the privileged software of virtual machine V for handling by the privileged software of the virtual machine.

In FIG. 3b, $\phi$ mapping was valid to a point $V_a$, but now in mapping $V_a$ (a virtual resource) into a real resource, a fault t occurs and is handled by the virtual machine monitor running on real machine R. Typically a FIG. 3a case would be where the GCOS* operating system is running on virtual machine V, and a user program operating in non-privileged mode under GCOS* attempted to use a privileged instruction of the operating system. In that case an exception is handled by the GCOS operating system.

A typical illustration for the FIG. 3b case is where a program in the same GCOS* operating system above tries to reference some part of main memory within the virtual memory allocated by GCOS* but discovers that that particular part of virtual memory is not in main memory at that particular point in time, and a fault results to the virtual machine monitor of the real machine R. The fault is directed to the VMM of R for handling by the VMM of R.

*Trademark of Honeywell Inc.

The $\phi$-map is combined with the recursive f-map result to produce the "general" composed map $$f_1 \circ f_{1,1} \circ \ldots \circ f_{l,i} \ldots {}_{1,1} \circ \phi.$$

Thus, for virtual machines regardless of the level of recursion, there is only one application of the $\phi$-map followed by n applications of an f-map. This is an important result that comes out of the formalism of distinguishing the f and $\phi$ maps. Thus, in a system with a complex $\phi$-map but with a simple f-maps, n-level recursion is relatively easy and inexpensive to implement.

In the model presented, f-maps map resources of level n+1 are mapped into resources of level n. It is equally impossible to define an f-map in which resources of level n+1 are mapped into process names of level n, which are then mapped into resource names of level n. This new f-map is called a Type II f-map to distinguish it from the Type I f-map which is discussed in this specification.

F. Interpretation of the Model

The model is very important for illustrating the existence of two very different basic maps in virtual machines. Previous concepts have not clearly distinguished the difference or isolated the maps adequately. The key point is that f and $\phi$ are two totally different maps and serve different functions. There is no a priori requirement that f or $\phi$ be of a particular form or that there be a fixed relationship between them. The $\phi$-map is the interface seen by an executing program whereas the f-map is the interface seen by the resources. In order to add virtual machines to an existing computer system, $\phi$ is already defined and only f must be added. The choice of whether the f-map is relocation-bound (R-B) type, paging type, etc., depends upon how the resources of the virtual machines are to be used. In any case, the f-map is recursive whereas $\phi$ need not be.

If a new machine is being designed, then neither $\phi$ nor f is yet defined. $\phi$ may be chosen to idealize the structures seen by the programmer whereas f may be chosen to optimize the utilization of resources in the system.

Another intrinsic distinction between the maps is that the f-map supports levels of resource allocation between virtual machines, while the $\phi$-map may establish lavers (rings, master/slave mode) of privilege within a single virtual machine.

Table I (infra) shows a comparison of properties of virtual computer systems using or attempting to use the above developed model. As can be seen from Table I, none of the existing or previously speculative systems provides direct support of completely general virtual machines. CP-67 has a non-trivial $\phi$-map but no direct hardware support of the f-map; the approach of Lauer and Snow (3) provides direct hardware support of the f-map but has a trivial $\phi$-map, i.e., $\phi$=identity.

TABLE I

| | | | | | DIRECT ACCESS TO $\phi$ PERMITTED? | | RECURSION AND RECURSIVE | RECURSIVE VIRTUAL MACHINE $E_{NE}$ STRUCTURE HARDWARE |
|---|---|---|---|---|---|---|---|---|
| SYSTEM | $\phi$ map | f map | $\phi_t = f \circ \phi$ | f $\circ \phi$ COM-POSER | READ | WRITE | COMPOSER | SUPPORTED |
| IBM CP-67 1 | Hardware (III generation) | Software | Software support to store translated $\phi$ | Software | No | No | Software composition | — |
| Gagliardi Goldberg VP 2 | Hardware (complex IV generation) | Software | Hardware support to store translated $\phi$ | Hardware | Yes | No | Hardware assisted composition | Tree |
| Lauer- | — | Hardware | — | — | — | — | Direct | Stack |

TABLE I-continued

"COMPARISON OF SYSTEMS USING VIRTUAL MACHINE MODEL";

| SYSTEM | φ map | f map | $\phi_t = f \circ \phi$ | f o φ COMPOSER | DIRECT ACCESS TO φ PERMITTED? READ WRITE | RECURSION AND RECURSIVE COMPOSER | RECURSIVE VIRTUAL MACHINE $E_{NE}$ STRUCTURE HARDWARE SUPPORTED |
|---|---|---|---|---|---|---|---|
| Snow 3 | | (relocation-bounds) | | | | hardware static composition | |
| Lauer-Wyeth 4 | — | Hardware (segmentation paging) | — | — | — | Direct hardware dynamic composition | Stack |
| Goldberg HV (This Specification and Drawings) | Hardware (completely arbitrary) | Hardware (completely arbitrary) | Evaluated dynamically | Direct hardware dynamic composition | Yes    Yes | Direct hardware dynamic composition | Tree |

Ref.
1. R. A. Meyer, L. H. Seawright - "A Virtual Machine Time-Sharing System" IBM Syst. Journal Vol. 9 No. 3, 1970
2. U. O. Gagliardi, R. P. Goldberg - "Virtualizable Architecture" Proc. ACM AICA International Computing Symposium, Venice, Italy 1972
3. H. C. Lauer, O. R. Snow - "Is Supervisor State Necessary" Proc. ACM AICA Int. Comp. Symp. Venice, Italy 1972
4. H. C. Lauer, D. Wyeth - "A Recursive Virtual Machine Architecture" Proceedings ACM SIGARCH - SIGORS Workshop "On Virtual Computer Systems, Cambridge, Mass. 1973"

Therefore, CP-67 must utilize software plus the layer relationship of the φ-map to simulate levels, whereas Lauer and Snow must utilize software plus the level relationship of the f-map to simulate layers. Thus the system is less general and will not support modern operating systems running directly on individual virtual machines.

The Gagliardi-Goldberg "Venice Proposal" (VP) suggests support of both the layer and level relationships. However, since the VP does not directly provide hardware support for f, software intervention is still required.

EMBODIMENTS OF THE INVENTION

A. HARDWARE VIRTUALIZER (HV)

The virtual machine model supra, provides insight into existing and proposed systems, and indicates a natural means of implementing virtual machines in all conventional computer systems. Since the f-map and φ-map are distinct and (possibly) different in a virtual computer system, they should be represented by independent constructs. When a process running on a virtual machine references a resource via a process name, the required real resource name should be obtained by a dynamic composition of the f-map and φ-map at execution time. Furthermore, the result should hold regardless of recursion or the particular form of f and φ. The first embodiment is the generalized embodiment described with reference to FIGS. 5, 6a and 6b. The second embodiment is a specific embodiment which incorporates φ=R-B map and f=paging map (in the main memory domain) as shown in FIG. 7 and may be added to the Honeywell 6000. The third embodiment incorporates φ=segmentation map and f=R-B in the main memory domain, and shown on FIGS. 8a and 8b. The Hardware-Virtualizer HV to be described hereinafter implements the above concept of the invention. The HV may be a part of an improvement to an existing system or an improved integral part of the design of a new one.

B. HV DESIGN AND REQUIREMENT

The design of a Hardware Virtualizer considers the following points:
(1) The database to store f;
(2) A mechanism to invoke f;
(3) The mechanics of map composition; and,
(4) The action on a VM-fault.

In the description which follows, a Hardware Virtualizer is described which performs a map composition function, and includes a description of the virtualizer itself, the supporting control mechanisms, typical instructions used for recursive virtual machine creation, and various type fault handling mechanisms.

Since existing computer systems such as the Honeywell Information Systems Inc. 6000 series, DEC PDP-10, and IBM System/360 series include some form of φ-map, the additional structure associated with the f-map is discussed only. The specification herein develops details of the invention by describing the 4 points of this section above, with respect to the generalized embodiment and more detailed descriptions of the structure and operation of the Hardware Virtualizer with respect to the two specific embodiments.

C. DATABASE TO REPRESENT f

The VMM at any level n creates and maintains a database which represents the f-map relationship between two adjacent levels of virtual machine resources, namely level n+1 to level n. This database is stored so that it is invisible to the virtual machine, e.g., level n+1, including the most privileged software. Let us assume that for economic reasons the database is stored in main memory. Then f, i.e., the virtual machine resource, may not be in the virtual memory of level n+1, but must be in the virtual memory of level n.

Figure 4:
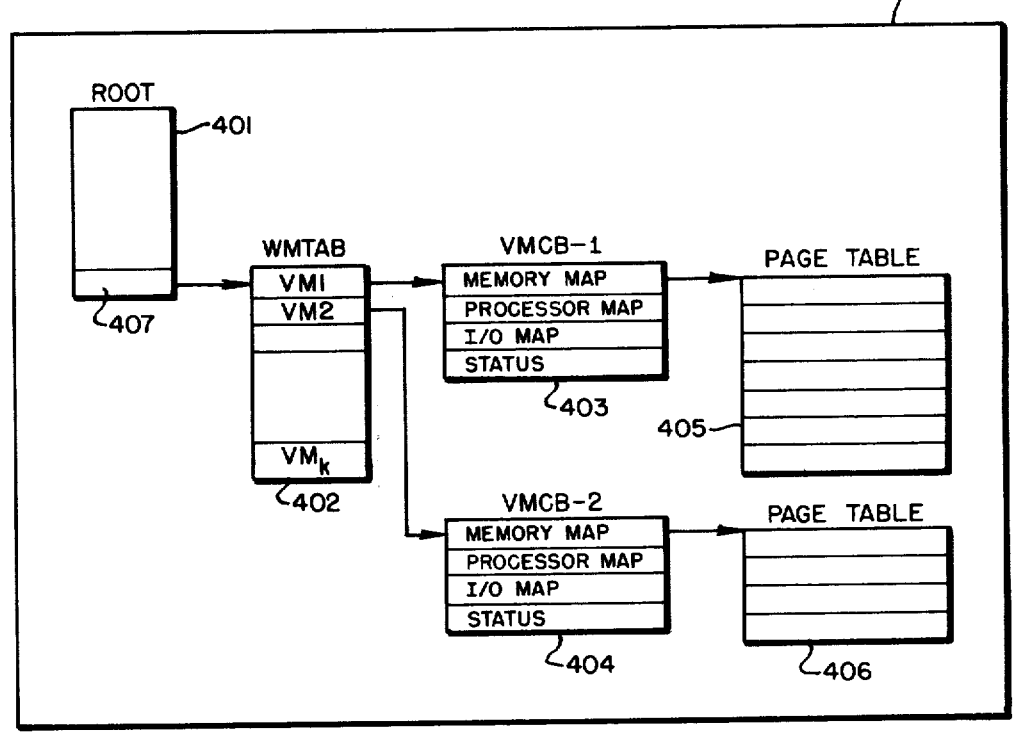
FIG. 4 is a schematic block diagram of the addressing formats in main memory of a general purpose computer indicating in part address levels of an f-map.

The only requirement on where the f-map is stored in any level n memory is that it be possible for the HV to locate it by applying a deterministic algorithm from the beginning (ROOT) of that level n memory. The f-maps corresponding to different virtual machines at the same level may be identified either implicitly or explicitly. FIG. 4 is a block diagram for identifying f-maps explicitly. Referring to FIG. 4 there is shown a block of main memory 400 in a given level n virtual machine in a typical computer system such as Honeywell 645 computer system or its offspring the Honeywell 6000 computer system both commerically available prior to May 31, 1973, the filing date of the parent to the instant application (see booklet entitled, Honeywell Series 6000-Summary Description, published by Honeywell Information Systems Inc. in 1972). The root 401 is a fixed known address in the block of memory 400 and contains within it (among other information) a VMTAB-pointer 407 which in turn points to the location in that block of memory, of the VMTAB (Virtual Machine Table) 402. The VMTAB 402 in turn contains k entries of VMCB-pointers VM1-VM$_k$. Each VMCB pointer points to a respective Virtual Machine Control Block. For example VMCB-pointer VM1 points to VMCB-1, 403 VM2 points to VMCB-2, 404 etc. Since the VMCB provides information for mapping the resources of the virtual machine, it typically includes such data hardware structures as a memory map, processors map, I/O map and status information for the virtual machine. In essence, therefore, the VMCB is the f-map for a particular virtual machine. For example VMCB-1 is the f-map for virtual machine 1, VMCB-2 is the f-map for virtual machine 2, etc. The specific form of the VMCB is dependent upon the f-map actually used, e.g. R-B paging, etc. If paging is utilized the memory map of the VMCB typically contains a page table 405, 406. (Details of the page-addressing scheme for the Honeywell 645 computer system are to be found in U.S. Pat. No. 3,412,382 issued Nov. 19, 1968 and entitled *Shared Access Data Processing System* which is hereby incorporated by reference to the instant application.)

Figure 5:
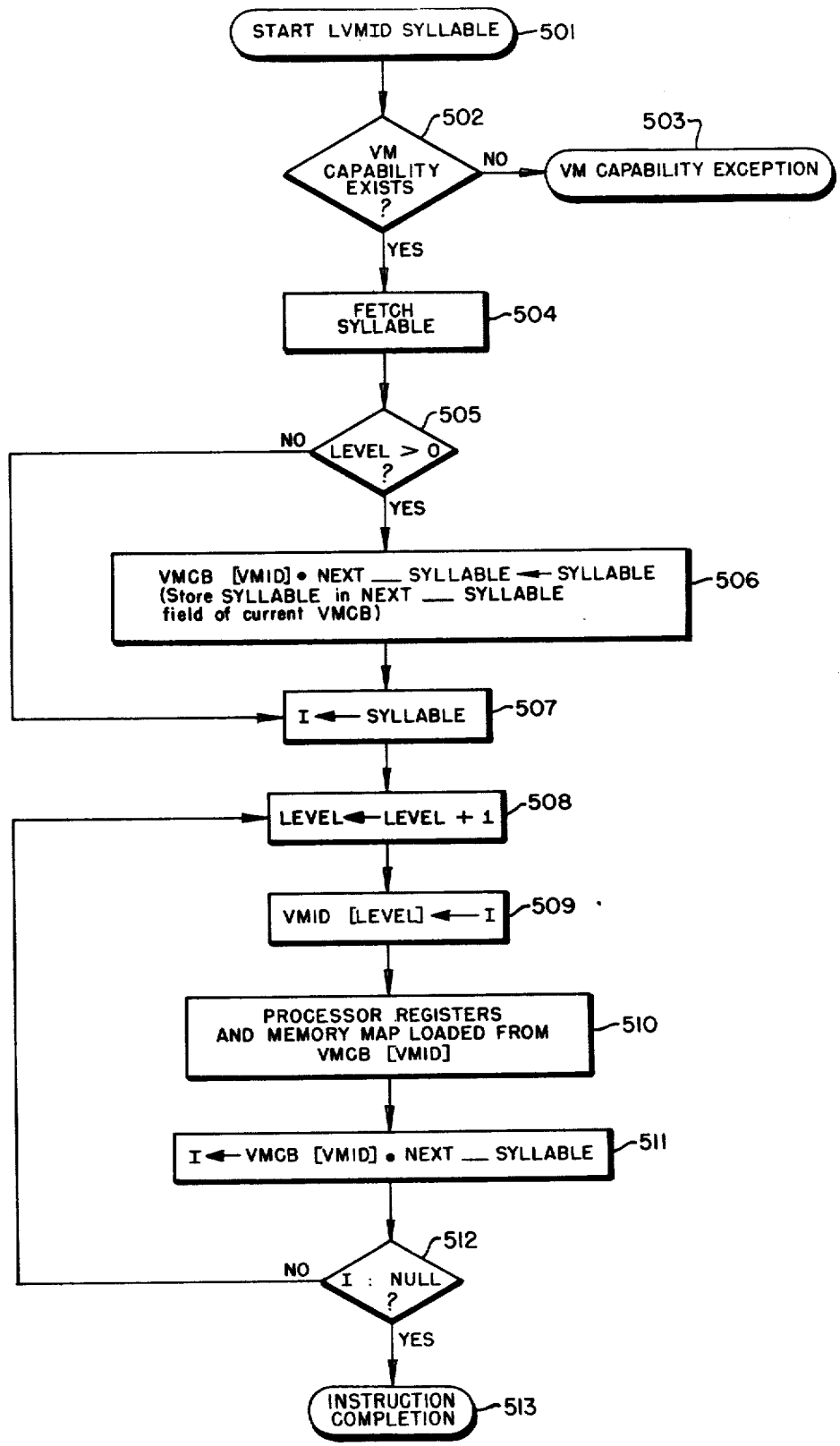
FIG. 5 is a flow chart of a firmware instruction for manipulating a hardware register indicating the addressing level of a selected one of a group of processes executing on the computer system.

Additional information that may be kept in the VMCB includes capability information for the virtual processor indicating particular features and instructions, present or absent. These capability bits include, for example, scientific instruction set or virtual machine instruction set, such as recursion. If recursion is supported, then the VMCB includes sufficient information to automatically restart a lower level virtual machine on a higher level VM-fault (FIG. 2C and FIG. 5, blocks 506–512).

The data structures herein are known to the firmware so that they can be exercised automatically in the course of doing the map composition, and provides data structures that are relative between level n+1 and level n.

D. MECHANISM TO INVOKE f

In order to invoke the f-map, the HV requires an additional known register and one instruction for manipulating it. The register is the virtual machine identifier register (VMID) 653 on FIG. 6b and 701 on FIG. 7, which contains the "tree name" of the virtual machine currently executing. The VMID is a multi-syllabic register, whose syllables identify all of the f-maps which must be composed together in order to yield a real resource name. If it is desired to run a virtual machine at level 2, then VMID contains 2 syllables, which is the tree name of that virtual machine at that level. An instruction LVMID, (load VMID) FIG. 5, appends a new syllable to the VMID register. Hence, if the current syllable in VMID is 1, and the VMM desires to start up virtual machine number 3, it utilizes the LVMID instruction to append 2 syllables to the current number in the VMID register making a concatenated number of 1.2.3.

The VMID register (and the LVMID instruction) have four crucial properties.

(1) The VMID register absolute contents can neither be read nor written by software;

(2) The VMID of the real machine is the null identifier, i.e. contains zero;

(3) Only the LVMID instruction appends syllables to the VMID;

(4) Only a VM-fault, or an instruction which terminates the operation of a virtual machine, removes syllables from the VMID.

FIG. 5 is the flow chart of the LVMID instruction which sketches the operation of the LVMID instruction while avoiding implementation details related to a specific choice of map. Referring to FIG. 5 the LVMID instruction is invoked 501, and a determination is made as to whether or not virtual machine (VM) capability exists 502, i.e. is this machine permitted to create virtual machines. If there is no virtual machine capability a VM capability exception 503, occurs otherwise a VMID syllable is fetched 504. A determination is then made as to whether or not the VM currently executing is at a level less than zero, 505. If the level is less than zero, the SYLLABLE fetched, i.e. the operand of the LVMID instruction, is stored in a NEXT SYLLABLE field in the current VMCB, 506.

In box 506 of FIG. 5, VMID is used as a subscript to indicate the current control block VMCB [VMID]; thus SYLLABLE of the operand of the LVMID instruction is stored in the NEXT SYLLABLE field of the current VMCB. SYLLABLE is appended to the VMID and the level is decremented (boxes 507, 508, 509). This new identified virtual machine is now activated and its processor registers, memory map etc. are loaded from its VMCB, 510. The NEXT SYLLABLE field of the active VMCB is fetched, 511. If this field is NULL, i.e. 0, box 512, the instruction completes, 513. If the NEXT SYLLABLE field is non-NULL, then the flow chart from block 508 to 513 provides the method of starting up a subtree of a virtual machine when a fault has jumped at least 2 levels of virtual machines and there still exits virtual machines structure above the level to which the jump was made.

E. MAP COMPOSER

Figure 6A:
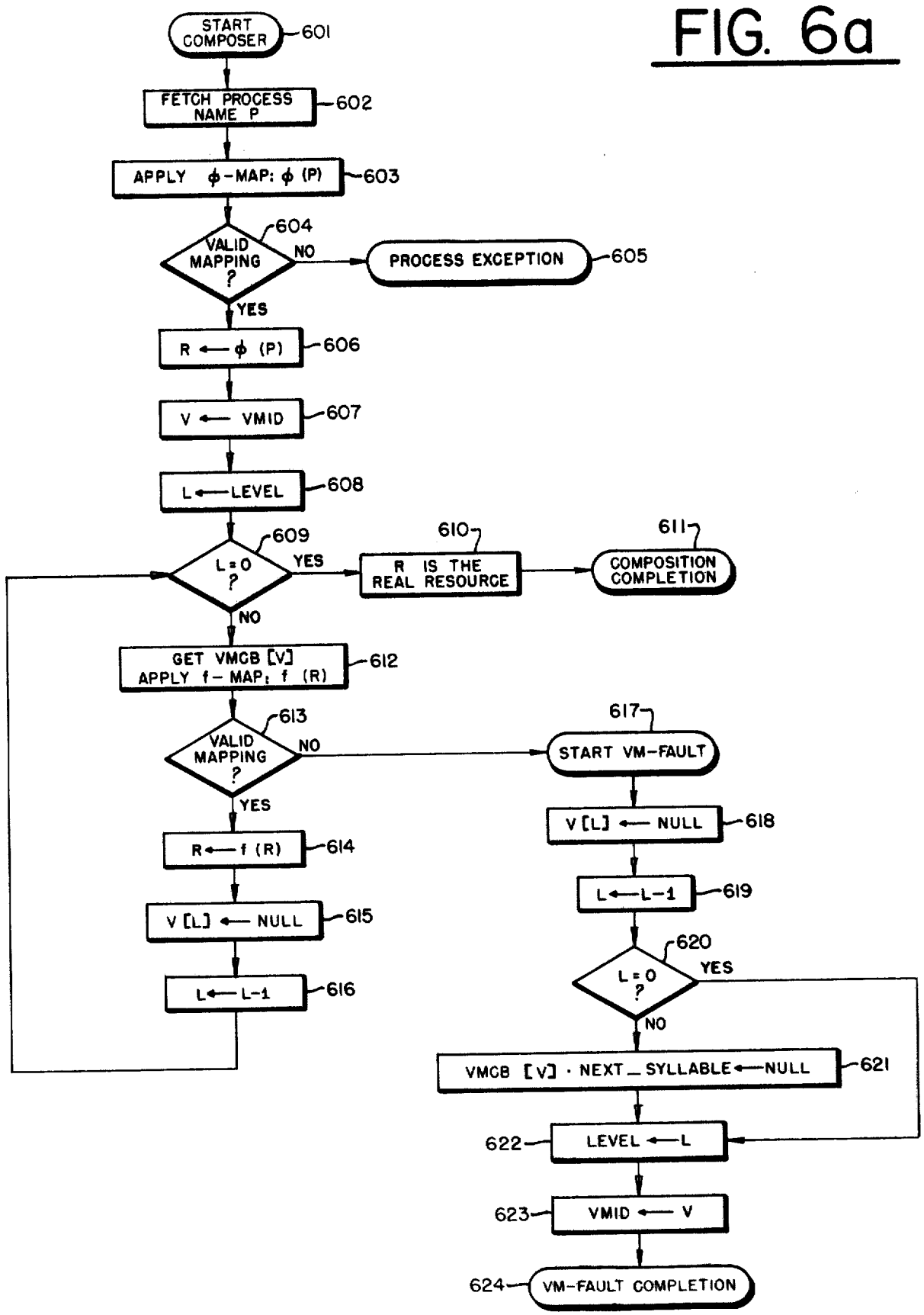
FIG. 6a is a flowchart of a firmware composition mechanism for mapping a resource name at any addressing level n+1 to a selected one of a group of processes executing on a general purpose computer at level 0.
Figure 6B:
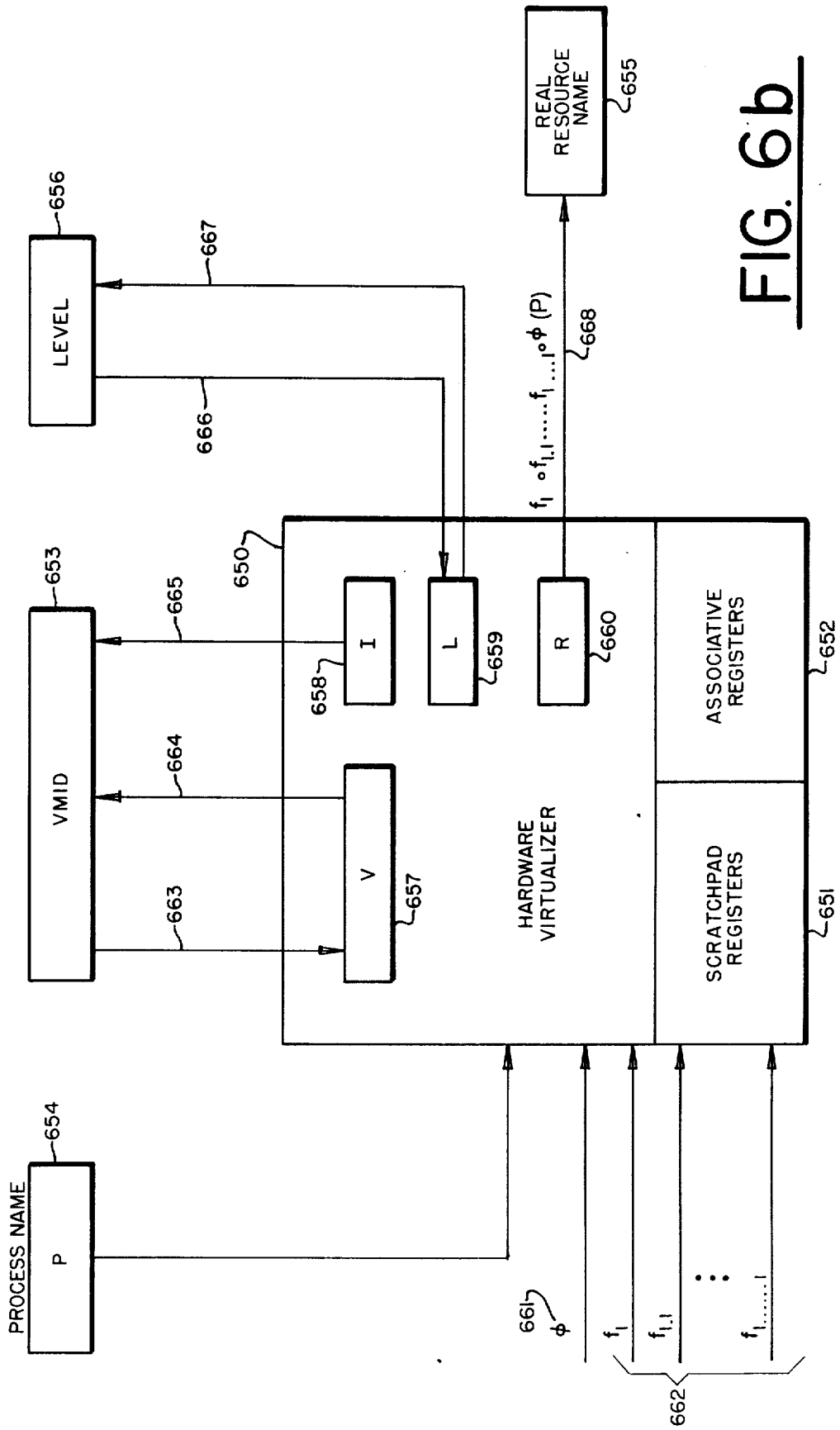
FIG. 6b is a schematic block diagram of the hardware virtualizer registers.
Figure 7:
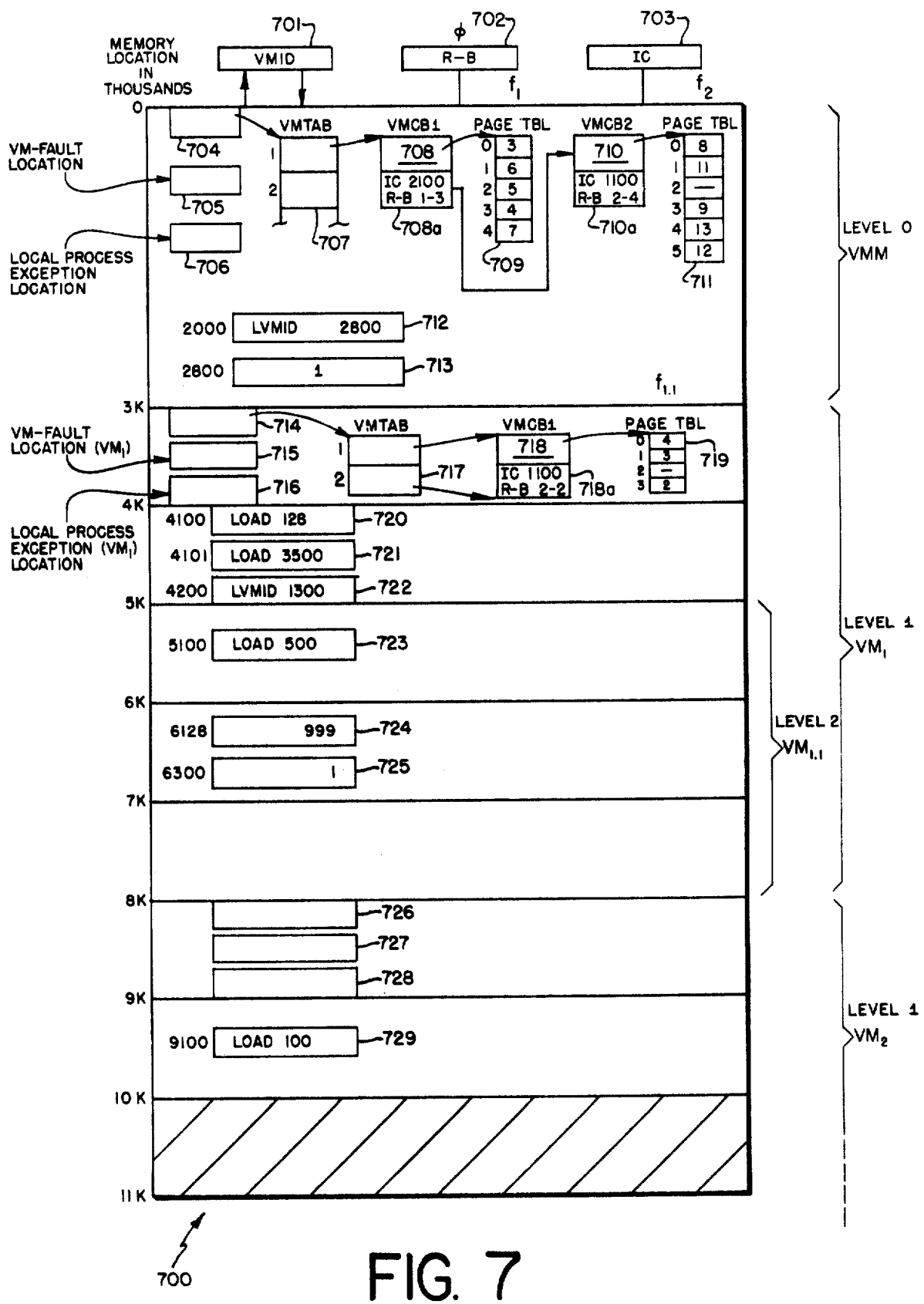
FIG. 7 is a diagram of one embodiment of a hardware virtualizer having specific f and $\phi$-maps.

The map composer, FIGS. 6a and 6b, provides the dynamic composition of the $\phi$-map (possibly indentity) and the active f-maps on each access to a resource. The $\phi$-map is known and may typically be the mapping mechanism of the Honeywell 645 computer system commerically available prior to May 31, 1973 and the active f-maps, i.e., the VMCB's are determined from the VMID register. The flow chart of FIG. 6a sketches the map composition mechanism while avoiding implementation details related to specific choice of maps. Reference numerals 601–608 show that portion of the flowchart of the firmware controlling the application of the $\phi$-map; reference numerals 609–616 show that portion of the flowchart of the firmware controlling the application of the f-map; whereas reference numerals 617–624 show that portion of the flowchart of the firmware that controls the handling of faults. As can be seen, the composer accepts a process name P and develops a real resource name R or causes a VM-fault.

Referring to FIG. 6a, the map composer is invoked 601 and a process name P is fetched 602. The $\phi$-map is applied to the process P in order to obtain $\phi$ of P, 603, and a determination is made as to whether or not there is a valid mapping 604. If there is an invalid mapping, e.g., an attempt to reference out-of-bounds memory, then a process exception occurs which is a local exception handled within the same virtual machine previously invoked; accordingly, this exception is visible to the privileged software and is handled by it and the VMID register is not affected.

If, on the other hand, the process $\phi$-mapping is valid, i.e., the value $\phi$ of P has been successfully calculated, the value $\phi$ of P is temporarily stored in the internal register resource name R, 606. The VMID register is then checked to determine if it is null, and if it is then the composition is complete and the calculated resource name R, is the real resource name. This is effectively done by taking the VMID value 607, copied into internal register V, and the level value, copied into scratch pad register L, 608 and determining whether or not the level value L is zero, 609; if a zero level is present, i.e., VMID is null, then R, previously mapped, is in fact the real resource 610 and the composition is complete 611.

If on the other hand, a zero level is not present 609, then R is not the real resource and the f-map, identified by the next syllable in the VMID register, must be applied. The f-map is then obtained from the VMCB identified by the current contents of the VMID register, 612. A determination is made as to whether or not there has been a valid mapping, 613; and if there has been a valid mapping, i.e, the value f(R) that appears to be the real resource has been calculated, 613, then it is necessary to determine whether f(R) is the real resource by applying blocks 614, 615, 616 and 609.

Accordingly, the f mapped value f(R) is copied over as if it is the real resource R 614, i.e., R is replaced by f(R). Then the Lth syllable of V, the internal register copy of VMID, is made NULL 615, and L, the internal level count is reduced by 1, 616. The level L is checked to determine if it is 0, 609, i.e., the machine is now at the real machine level, and if it isn't blocks 612–616 are repeated, until L=0 whereupon it is determined that R is the real resource 610, and the composition is complete.

To illustrate the process of blocks 612–616, assume that tree name 1.2.4 is in VMID register. The VMID register has been copied into V (See block 607) and R has been replaced by f(R) (see block 614). The Lth syllable of V is 4 and it is not 0, 615. Accordingly, the level L, kept as an internal register is reduced by 1, and the tree name in V is now 1.2 since the last level 4 has been taken away. Therefore, there are now 2 levels and when the level L is checked 609, it will not be zero, and blocks 612–616 are repeated again. Now the internal identifier register V has two levels 1.2 and the Lth syllable 2 is at the second level. Accordingly, one more level is taken away 616, and the name now stands as 1, and there the level is checked to see if it is zero, 609. Since it isn't, the procedure would be repeated one time; but when L is checked this time 609, L will be zero and the process will branch to block 610, and the composition will be complete 611.

Returning now to decision block 613 of FIG. 6a, if there has been an invalid mapping, i.e., the resource has not been located, then a virtual machine fault occurs 617. The current syllable being utilized in the internal identifier register, V, is removed, 618, and the internal level register, L, is decremented 619. A test is made if the new level is to be level zero, 620. If L is not zero, the NEXT SYLLABLE field in the current VMCB must be set to NULL, 621. In either case, the internal level register, L, is copied into the LEVEL register 622, and the internal identifier register, V, is copied into the VMID register 623. A VM-fault is signalled to the currently activated virtual machine, 624.

FIG. 6b is a block diagram of part of the generalized embodiment and related directly to FIGS. 5, 6a and the text describing them, supra. The blocks associated with reference numerals 650 depict that portion of the computer system hardware comprising the map composer and includes the hardware-firmware and internal registers 657, 658, 659, 660 utilized by the generalized hardware virtualizer. Scratchpad registers 651 and associative registers 652 may be utilized for performance reasons in certain specific embodiments (see discussion and FIG. 8b infra). Under control of the particular identifier in the VMID register 653, the hardware virtualizer takes a given process name P in P register 654, applies a $\phi$-map 661 (See above-identified U.S. Pat. No. 3,412,382 which has the equivalent $\phi$-map of the Honeywell 645 computer system) and then a collection of f-maps 662, and produces a real resource name in register 655.

Associated with the VMID register 653, is a LEVEL register 656, which indicates the current level of the active virtual machine, i.e., the number of valid syllables in the VMID register. Both the VMID register 653 and LEVEL register 656, are chosen to be some arbitrary maximum size. The generalized embodiment uses the following explicit internal HV registers: V register 657, into which is copied the VMID register 663, (FIG. 6a, register numeral 607), which is utilized in obtaining f-map values in the composition algorithm (FIG. 6a, reference numeral 612), and which is copied back into the VMID on a fault, 664, (FIG. 6a, reference numeral 623); L register 659, into which is copied the contents of LEVEL register 666 (FIG. 6a, 608), which is utilized in composition algorithm (FIG. 6a, 609, 616), and which is copied back into the LEVEL register on a fault, 667 (FIG. 6a, 622); R register 660, which maintains the partially composed results (FIG. 6a, 606, 614) until composition is completed and the real resource name R in register 660 is sent to the real resource register 655 (FIG. 6a, 610); I register, 658, which is used to append syllables to the VMID 665, during LVMID instruction (FIG. 5, 507, 509, 511, 512).

The above map composer and LVMID instruction (FIG. 5) to invoke f are implemented in firmware and hardware utilizing typical computer control units well known in the art. (See Microprogramming Principles and Practices; by Samir S. Husson, published by Presentice Hall, Inc. Englewood Clitts, N.J., 1970). Moreover, a typical associative memory, as disclosed in U.S. Patent Application Ser.No. 283,617 entitled "Address Development Technique Utilizing a Content Addressable Memory" and filed on Aug. 24, 1972 now U.S. Pat. No. 3,800,286 issued 3/26/75, and assigned to the same assignee as the instant invention may be, used. These documents are incorporated herein by reference.

There are basic reasons why processes can execute on the vitural machine will efficiency approaching that of the real machine. Most current computer systems which employ memory mapping (in the $\phi$-map) make design assumptions concerning program behavior. These assumptions are also applicable to virtual machines as well. Some of these assumptions affecting computer system performance are temporal and specify locality of references by executing programs. In multiprogramming systems, the process map is not altered very frequently, i.e., process locality, and in virtual machine systems, the VMID is not altered very frequenctly, i.e., virtual machine locality.

Combining all of these locality notions, it is determined that multi-level recursive vitural machines need not have significantly different performance from real machines. Another way of phrasing this observation is that temporal and spatial locality are name invariant. Regardless of what a block of memory is called, or how many times it gets renamed (via composed f-maps), there is still an intrinsic probability of reference to it by an executing program. Thus, a virtual machine, supported by a map composer and associative store, enjoys comparable performance to the real machine.

If the f-map and $\phi$-map are sufficiently simple then the associator may not be needed. For example, if f=R-B, where R-B is relocation-bounds register, $\phi$=identity, then it may be sufficient for the HV to provide "invisible scratchpad registers" (generally located in the CPU) to maintain statically composed R-B values which are altered only on a level change.

If $\phi$ involves paging or segmentation, then the real machine itself requires an associator for performance reasons. The HV associator will replace it. If the f-map is simple, e.g., f=R-B, then the HV associator will be very similar; if f includes paging it will be somewhat different. The choice of whether to include the VMID or level as part of the search key of the associator can be made for price-performance reasons. The typical associator previously incoporated herein by reference maps directly from a process name P to a real resource name by shortcircuiting the above composer mechanism. This is discussed in detail beginning on p. 154 of a thesis by R. P. Goldberg on "Architectural Principles for Virtual Computer Systems" available at Harvard University as of Nov. 1972. (This document is also incorporated herein by reference).

F. EXAMPLE EMBODIMENTS OF A HARDWARE VIRTUALIZER

As indicated earlier, the Hardware Virtualizer serves as the central mechanism in the design of a new computer system or as an extension to an existing computer system. In the latter case, a prior-art computer system M is assumed with a given $\phi$-map. The HV construction, i.e., additional data structures, new instruction (LVMID), VM-fault etc., defines a new machine M' with added unique functionality. The Hardware Virtualizer guarantees that M' is a recursive virtual machine capable of supporting a hierarchy of M' machines with M machines as terminal nodes where desired.

In order to clarify the operation of the Hardware Virtualizer, two examples of its use are deomonstrated. The first example is developed around a typical third generation system similar to the Honeywell 6000. The second example is developed around a more complex computer system.

In the first example, some features of a typical third generation architecture are presented, the extensions introduced by the Hardware Virtualizer are indicated, and then the execution of some instructions is illustrated. The example below is developed around a canonical third generation computer system, similar to the Honeywell 6000, DEC PDP-10, or IBM System/360. The salient features of the architecture are (1) the privlieged/non-privilegedmode distinction (master/slave, supervisor/problem, etc.) as part of the instruction counter (IC), (2) a single relocation-bounds register (R-B) whose absolute contents may be loaded in privileged mode, and (3) some fixed locations in main memory where the old and new R-B and IC registers are swapped on a process exception.

To simplify the example it is assumed that the R-B register is active, even in privileged mode. Furthermore, all instructions are assumed to be executing in privileged mode. Since mode violations are local process exceptions and are treated identically to R-B violations, there is no need to illustrate them both. The extension of the example to include a homogeneous treatment of I/O utilizes the principles, hardware and techniques taught above. However, for what is illustrated in this example, the R-B map is the $\phi$-map.

The Hardware Virtualizer herein is implemented by the following extensions to the third generation architecture. The modifications introduced by the addition of a page f-map (in the memory domain), is illustrated and 1000-word pages are assumed. (See FIG. 7). The modifications include:

(1) database means to store f—Some fixed known location, 704, 714, (FIG. 7) in the memory 700 of level n, points to the virtual machine table (VMTAB) 707, 717 which describes the virtual machines (VMCB1, etc.) of level n+1. In this example, each virtual machine control block (VMCB) (708, 710, 718) illustrates a memory map (page table) 709, 711, 719 respectively and a processor map 708a, 710a, 718a. The page maps correspond to the f-maps, e.g., f1 to 709, and f2 to 711. The processor map includes storage for level n+1's IC and R-B. Also included but not illustrated is the level n+2 NEXT SYLLABLE which is stored whenever level n+1 issues an LVMID instruction.

(2) a mechanism to invoke f—A multi-syllable VMID 701 register and a LVMID instruction previously discussed are added. When a virtual machine is activated, its IC and R-B are loaded from its control block (VMCB) 708a, 710a, 718a.

(3) a composer—A hardware-firmware composer, previously discussed, supported with scratchpad memory and associator, for performance reasons, is added.

(4) the action on a VM-fault—The IC and R-B are stored in their VMCB, the appropriate syllable(s) are removed from the VMID, and control passes to a fixed known location, such as VM-fault location 705, 715 in the VMM.

Note that this example illustrates a Type I f-map in which resources of level n+1 are mapped into resources of level n. Thus, the relocation-bounds register R-B value of level n, used as the $\phi$-map, does not enter into the mapping. In this example, when LVMID is executed, relocation is coincidentally zero, but need not be.

The first example

The following example typically incoporates the hardware virtualizer into the Honeywell 645 computer system, the Honeywell 6000 computer system or the IBM 360 computer system, all commerically available prior to May 31, 1973. The following patents relating to the Honeywell 645 system are incorporated herein by reference to the instant application:

a. Shared Access Data Processing System, having U.S. Pat. No. 3,412,382 and issued Nov. 19, 1968;

b. Reconfigurable Data Processing System, having U.S. Pat. No. 3,413,613 and issued Nov. 26, 1968;

c. Data Processing System Employing Indirect Character Addressing Capability, having U.S. Pat. No. 3,425,039 and issued on Jan. 28, 1969;

d. Apparatus for Processing Data Records In A Computer System, having U.S. Pat. No. 3,409,880 and issued Nov. 5, 1968.

FIG. 7 is a schematic diagram which shows the state of main memory in the hardware virtualized machine. FIG. 7 also shows the three registers, VMID, R-B, and IC, but their values are not indicated. Instead, Table II (infra) shows six sets of values for VMID, R-B, and IC. For each set, the instruction which is executed is identified and the evaluation sequence used in developing an absolute physical memory address is shown. The table entry includes indication of a process exception, VM-fault, and any change to the VMID. The R-B register values are represented as r-b where r is the relocation (in thousands of words) and b is the amount of contiguous allocation (in thousands of words).

while local process exceptions for $VM_1$ are handled in local process exception ($VM_1$) location 716.

TABLE II
HARDWARE VIRTUALIZER EXAMPLE: EVALUATION SEQUENCES

| NE | VMID | R-B (r-b) | IC | EVALUATION SEQUENCE | VMID AFTER EVAL. SEQ. | POINT ILLUSTRATED |
|----|------|-----------|------|------------------------------------------------------------------------------------------------------------|----------------------|----------------------------------------------|
| 1  | NULL | 0–14      | 2000 | IC is 2000<br>$\phi(2000) = 2000$<br>Fetch inst: LVMID 2800<br>$\phi(2800) = 2800$<br>Append 1 to VMID    | 1                    | LVMID instruction                            |
| 2  | 1    | 1–3       | 2100 | IC is 2100<br>$\phi(2100) = 3100$<br>$f_1(3100) = 4100$<br>Fetch inst: LOAD 128<br>$\phi(128) = 1128$<br>$f_1(1128) = 6128$<br>Load 999 | 1 | Virtual Machine instruction execution |
| 3  | 1    | 1–3       | 2101 | IC is 2101<br>$\phi(2101) = 3101$<br>$f_1(3101) = 4101$<br>Fetch inst: LOAD 3500<br>$\phi(3500) = e$       | 1                    | Process exception in virtual machine         |
| 4  | 2    | 2–4       | 1100 | IC is 1100<br>$\phi(1100) = 3100$<br>$f_2(3100) = 9100$<br>Fetch inst: LOAD 100<br>$\phi(100) = 2100$<br>$f_2(2100) = t$ | NULL | Virtual Machine fault and different VMID |
| 5  | 1    | 0–5       | 3200 | IC is 3200<br>$\phi(3200) = 3200$<br>$f_1(3200) = 4200$<br>Fetch inst: LVMID 1300<br>$\phi(1300) = 1300$<br>$f_1(1300) = 6300$<br>Append 1 to VMID | 1.1 | LVMID with recursion |
| 6  | 1.1  | 2–2       | 1100 | IC is 1100<br>$\phi(1100) = 3100$<br>$f_{1.1}(3100) = 2100$<br>$f_1(2100) = 5100$<br>Fetch Inst: LOAD 500<br>$\phi(500) = 2500$<br>$f_{1.1}(2500) = t$ | 1 | Recursive instruction execution and VM-fault |

The six lines of Table II divide into three sets, lines 1–3, 4, and 5–6. Within these sets, lines 1–3 execute consecutively and lines 5–6 also execute consecutively.

Referring to FIG. 7, physical main memory, 700, starts at location 0 and extends beyond 11K words. A first boundary of main memory is shown at 3000 words, and thereafter every 1000 words up to 11,000 words. This memory may typically be a part of the Honeywell 645 or 6000 system both commercially available prior to the filing date of the parent to the instant application which usually utilizes the GCOS* operating system to manipulate the $\phi$-map. In addition to the instruction counter IC 703, and the relocation-bounds register R-B 702, the virtual machine identifier register VMID 701 has been added. The VMID register 701 is not software visible, i.e. not accessible to software, whereas the R-B register 702 and IC register 703 are software visible, i.e. accessible to software. The real machine is shown with VMM running between memory locations 0 and 3K. A first virtual machine $VM_1$ locations 3K and 8K, with another virtual machine $VM_{1.1}$ shown between memory locations 5K and 8K at a second level and having $VM_1$ as a parent. Another virtual machine $VM_2$ is shown between memory locations 8K and 11K.

*Trademark of Honeywell, Inc.

Local process exceptions for the real machine are handled in the local process exception location 706, These locations indicate the point to which a program running on their respective machines must be transferred when there is a process exception, i.e., $\phi$-map exception. In that case the privileged software (in this example GCOS) gains control. Similarly when a fault occurs in the f-map domain as previously shown, the VMM gains control, by referring a program running on a given virtual machine to its appropriate VM-fault location area 705, 715.

Referring to FIG. 7 and Table II, let us step through the first several evaluation sequences. In line 1, Table II, the VMM is running on the real machine i.e. the VMID 701 is null. All control blocks VMCB's have been set up and it is time to activate virtual machine $VM_1$. The instruction counter 703 value is 2000. Since the value R-B register 702 is 0–14, we add zero to 2000 (and check that 200 is less than 1900) and obtain $\phi(2000)=2000$. The VMID is NULL. Therefore, the resource name 2000 is a real resource and the instruction (LVMID 2800) at physical location 2000 (reference numeral 712) in FIG. 7 is fetched. We apply the R-B map to 2800 i.e. locate location 2800, reference numeral 713 by using the $\phi$ map of the machine and eventually fetch 1 (the contents at location 2800) which is loaded into the VMID register 701.

Virtual machine $VM_1$ at level 1 is now activated and its IC and R-B registers are loaded from VMCB1 708a. Line 2, Table II shows that IC, 703, receives the value 2100 and R-B, 702, the the value 1–3. Even though the memory of virtual machine $VM_1$ is 5000 words, as can be seen from its page table 709, the R-B register 702 limits this active process to addressing only 3000 words. This limit was presumably set by the operating system of virtual machine $VM_1$ because the active process is a standard (non-monitor) user.

Referring now to line 2 of Table II it is seen that IC is 2100. To apply the $\phi$-map 1000 is added checking that 2100 is less than 3000, and obtain $\phi(2100)=3100$. Since the VMID is 1, we are operating on a virtual machine and we must apply $f_1$ to map the virtual resource 3100 to its real equivalent. The page table $f_1$ 709 pointed at by VMCB1, 708 indicates that virtual page 3 is at location 4000. Therefore, $f_1(3100)=4100$, reference numeral 720 and the LOAD 128 instruction is fetched.

The other sequences may be evaluated in the same manner utilizing Table II. Line 3 illustrates a process exception to the local exception handler of VM1, line 5 illustrates activation of recursion, and lines 4 and 6 illustrate VM-faults to the fault handler of their respective VMMs.

Scratchpad registers (FIG. 6b, 651) will improve performance by pointing directly to the absolute location of the active page tables, e.g., $f_1$ 709. Associative registers (FIG. 6b, 651) will improve performance by remembering the several most recently composed map values, p and f o $\phi$ (p). Thus, after completion of line 2 in Table II there will be entries in the associative memory mapping process name 2000 into real resource name 4000, and process name 0000 into real resource name 6000. After the completion of the instruction "fetch" in line 6 of Table II, there will be an entry in the associative memory mapping process name 1000 into real resource name 5000.

It should be noted that a paged f-map has been added which is invisible to software at level n. The pre-existing R-B $\phi$-map remains visible at level n. Thus, operating systems which are aware of the R-B map, e.g., GCOS*, but unaware of the page map may be run on the virtual machine without any alterations.
*Trademark of Honeywell, Inc.

Note that the addition of an R-B f-map instead of the paged f-map is possible. This new R-B f-map would be distinct from, and an addition to, the existing R-B $\phi$-map; it would also have to satisfy the recursion properties of f-maps. Similarly, a paged f-map added to a machine, such as the IBM 360/67, would be distinct from the existing paged $\phi$-map.

The Second Example

The second example is developed around a more complex computer system, such as the Honeywell 6180. For purposes of this example, its additional complexity over the third generation computer (supra) is a segmented address space. Addresses in the machine are represented as s/d where s is the segment number and d is the displacement within the segment. The normal address development then uses a segment table to locate each segment.

Figure 8A:
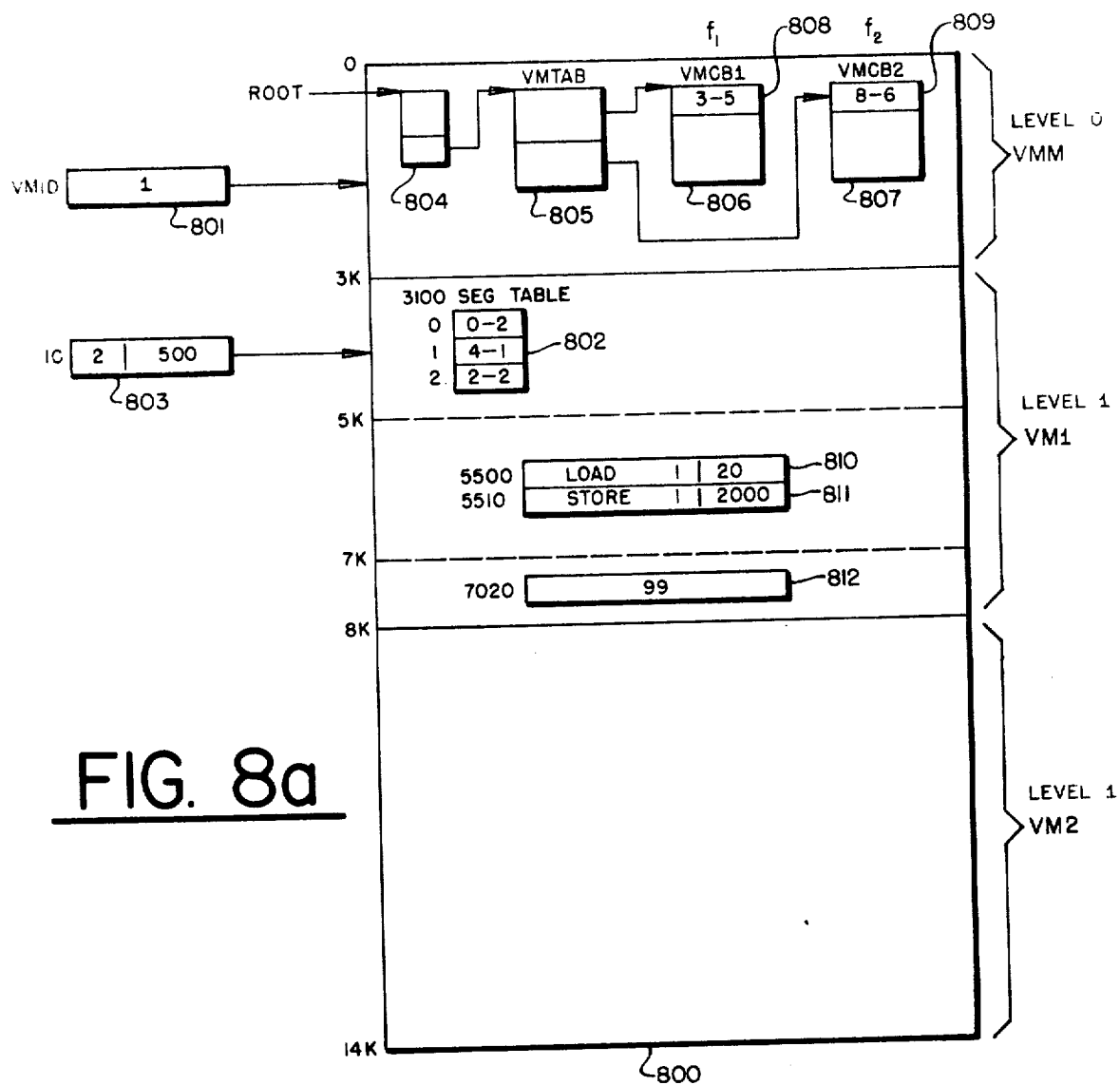
FIGS. 8a and 8b are schematic block diagrams of another embodiment of a hardware virtualizer with different f and $\phi$ maps.

The Hardware Virtualizer herein is implemented by the same extensions as in the previous example with the following exceptions, the $\phi$-map is segmentation and the f-map is R-B. The second example will illustrate the differences, only. Referring to FIG. 8a, some fixed known location 804, in the memory 800 of level n points to the VMTAB, 805, which describes the virtual machines (VMCB1), etc) of level n+1. In this example, each VMCB (806, 807), illustrates an R-B memory map 808, 809, respectively, which is stored contiguously to the rest of the VMCB. The processor map, i/o map, and status are not illustrated. Thus, in the main memory domain, the R-B map is the f-map. The VMID register 801 and previously discussed LVMID instructions are added. The map composer and VM-fault mechanism previously discussed (FIGS. 6a, 6b) are added.

The Example

Referring to FIG. 8a, physical main memory, 800, starts at location 0 and extends beyond 14K words. The solid line boundaries of main memory separate virtual machines. Thus, the VMM is located between 0 and 3K, VM1 is located between 3K and 8K, and VM2 is located between 8K and 14K. The dash line boundaries of main memory separate the segments for a process P, running on virtual machine VM1. (See below).

When execution begins, process $P_1$ is active and its segment table 802 is being used for $\phi$-map address development. The instruction counter (IC) 803 value is 2/500. Then $\phi(2/500)=2500$ since segment 2 is at location 2000 within the memory of VM1. Since the VMID, 801, value is 1, the map $f_1$ must be applied to the result. Thus $f_1(2500)=5500$. Thus, the instruction at location 5500, 810, is fetched and executed. This requires address development of the operand field, which produces $\phi(1/20)=4020$, $f_1(4020)=7020$. Thus, the contents of location 7020, 812 are loaded. The IC is incremented to 2/501 and execution continues. The next instruction, i.e., ($\phi(2/501)=2501$, $f_1(2501)=5501$, is located at location 5501, 811, and it is fetched. This instruction, 811, requires the operand field 1/2000 to be mapped. However, $\phi(1/2000)=e$ causes an exception since the displacement, i.e., 2000, is greater than the size of segment, i.e., 1000. The exception causes transfer of control to the privileged software within the current virtual machine VM1. Thus the VMID, 801, is unaffected by the exception.

Figure 8B:
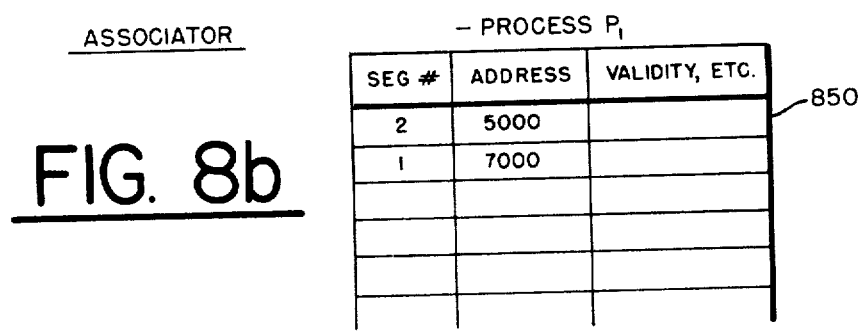

In order to improve performance, there will be scratchpad registers (FIG. 6b, 651) and associative registers (FIG. 6b, 652). FIG. 8b illustrates the contents of the associator, 850, after the execution in this example, FIG. 8a. Referring to FIG. 8b, segment 2 will be a search key to its absolute physical location regardless of recursion.

APPENDIX

GLOSSARY architecture: attributes of a system as seen by the programmer, i.e. the conceptual structure and functional behavior, as distinct from the organization of the data flow and controls, the logical design, and the physical implementation.

associator: hardware device for performing rapid parallel search.

basic machine interface: the set of all software visible objects and instructions that are directly supported by the hardware and firmware system.

control program: virtual machine monitor.

emulation: techniques for simulating an interior decor on a machine with some different one.

exception: trap caused by process violation [different from fault]; control should remain within executing virtual machine.

family: compatible series of computers with possibly minor interior decor differences, e.g. 360/40 and 360/67.

family-virtualizing: the virtual machine is not identical to the host but is a member of the same computer family. May not be recursive.

FV (family-virtualizing): the virtual machine is not identical to the host but is a member of the same computer family. May not be recursive.

f (virtual machine map): abstraction of map between two levels of virtual resource allocation.

f-map: abstraction of map between two levels of virtual resource allocation.

firmware: logic circuits and read only memory that may be altered by software under certain circumstances.

$\phi$-map: abstraction of map from process names, supported by hardware and manipulated by operating system, to resource names.

$\phi$(process map): abstraction of map from process names, supported by hardware and manipulated by operating system, to resource names.

generation: architectural characteristics of the principal machines of that generation [In this document, generation always refers to architecture, never to physical implementation, etc.].

HV (hardware virtualizer): collective title for hardware-firmware design which directly supports efficient virtual machines.

hardware virtualizer: collective title for hardware-firmware design which directly supports efficient virtual machines.

HVM: hybrid virtual machine.

host machine: bare machine on which virtual machine monitor runs.

host operating system: operating system under which Type II virtual machine monitor runs.

hybrid virtual machine: virtual machine in which all instructions issued within the most privileged layer are software interpreted and all other instruction execute directly.

II generation: second generation architectures typical of IBM 7090.

III generation: third generation architectures typical of IBM 360.

IV generation: fourth generation architectures with elaborate, rich process structure implemented in firmware.

interior decor: software-visible definition of a system, i.e. architecture.

intra-level map: map within a virtual machine level which establishes the (layer) structure within that level: the map may be visible to privileged software of that level e.g. $\phi$-map.

inter-level map: (VMmap) map between two levels of virtual machines, e.g. level n+1 to level n, which is invisible to the higher level, e.g. level n+1 e.g. f-map.

invisible: unable to be detected in software.

layer: restricted access structure (within a level) such as master/slave modes or rings.

level: number of f-maps which must be successively applied to map a virtual resource name into a real resource name: also corresponds to the number of syllables in the VMID: thus, the real machine is level 0.

map: to transform information from one form to another; to establish correspondence between the elements of one set and the elements of another set.

native mode: operation of system, e.g. CPU, with preferred order code, not emulation.

null identifier: zero order code: instruction set.

PCB: process control block, process status kept in system base.

P-name: name used by process to refer to some entity.

primitive: psuedo instruction call, etc.

process map: abstraction of the map from process names, e.g. segments numbers, to resource names, e.g. memory location, $\phi$-map.

privileged instruction: instruction which executes (correctly) only in privileged mode, i.e. supervisor state, ring zero.

R-name: real resource name

R-B: relocation-bound form of address relocation, as in DEC PDP-10.

resource map: virtual machine map, f-map.

ring: layered protection system, generalization of master/slave mode, supervisor/problem state.

ring 0: most privileged ring.

ROOT: origin pointer within memory of virtual machine.

RPW: running process words, in system base in typical IV generation machine contains identifier of active process.

SV: self-virtualizing, recursive virtual machine.

self-virtualizing: the processor of the virtual computer system is identical to the host, recursive virtual machine.

semaphore: means for interprocess communication in typical IV generation computer system.

supervisor call: (SVC) instruction which is used to communicate with the operating system.

system base: database directly accessed by firmware (and updated by priviledged software) of typical IV generation system to support implementation of the process model.

virtual machine: a hardware software duplicate of a real existing computer system in which a statistically dominant subset of the virtual processor's instructions execute directly on the host processor.

virtual machine model: composition of abstract process map and resource map to express running a process on a virtual computer system.

virtualization: act of creating/running virtual machine(s).

virtualizable: able to create (self-virtualizing) virtual machine(s).

visible: accessible

VM-fault: resource fault by virtual machine to VMM.

VM-level fault: VM-fault.

VMmap: abstraction of map between two levels of virtual resource allocation [completely distinct from process map] f-map.

VM-recursion property: in self-virtualizing virtual machine, ability to run a VMM on the VM.

ABBREVIATIONS

BOS: Basic Operating System/360.
CMS: Cambridge Monitor System.
CPU: Central Processing Unit.
OS/ASP: OS/360 Attached Support Processor.
DOS: Disk Operating System/360.
DOS-APL: DOS-APL/360 (A Programming Language).
ETSS: Experimental Time Sharing System (HITAC).
I/O: Input/Output.
ITS: Incompatible Time Sharing System.
MTS: Michigan Technical System.
TOS: Tape Operating System/360.

TOS/TDOS: Tape Operating/System Tape-Disk Operating System (HITAC).

Type I SV: Tape I self-virtualizing virtual machine.

Type I VMM: the virtual machine monitor (VMM) runs on a bare host machine.

Type II VMM: the VMM runs on an extended machine host, under the host operating system.

UMMPS: University of Michigan Multiprogramming System.

VCS: virtual computer system.

VMCB: Virtual machine control block in system base of hardware virtualizer provides f-map for virtual machine.

VMTAB: Virtual machine table in system base of hardware virtualizer contains pointers to VMCB's for virtual machines.

VM: Virtual machine, (herein never virtual memory).

VMID: virtual machine identifier register in hardware virtualizer indicates active virtual machine.

LVMID: load VMID instruction in hardware virtualizer which appends next syllables to the VMID register and dispatches the virtual machine.

VMM: virtual machine monitor, software which mediates between the virtual machine and host.

VMTSS: virtual machine time sharing system.

V-name: virtual resource name.

What is claimed is:

1. In a computer system including a general purpose host computer, including software and a $\phi$ map, and having typical real resources such as a central processing unit, for executing instructions as to processes of a user program, and a main memory, and at least one virtual computer having virtual resources, the virtual computer and virtual resources being simulated duplicates of the host computer and real resources, respectively, the host computer also including an individual virtual machine monitor for controlling each virtual computer, the combination of the host computer and each virtual computer being mapped at levels of operation, each level of the virtual computers having virtual resources and successively higher levels of the combination being identified by a number (n+1) to 0, the levels (n+1) through n to level 1 being virtual operating levels of the virtual computers, n being any decimal integer greater than 0, and the 0 level being the real operating level of the host computer having real resources, wherein the instructions of the user program are mapped to real resources, apparatus in which the host computer further includes a hardware virtualizer comprising:

(a) register means for controlling access to the individual virtual operating levels (n+1) through n to level 1;

(b) means invisible to all software of the virtual machine and responsive to said register means for mapping the (n+1)th virtual resources of said (n+1)th level into the nth level and into succeedingly sequentially higher levels to and including level 1, for establishing a relationship between the virtual resource of adjacent levels of the virtual machine;

(c) means visible at least to privileged software of the virtual machine for indicating a correspondence between selected ones of said processes and selected ones of said real resources only from level 1 to the 0 level of operations; and (d) means responsive to said register means, said mapping means and said indicating means for establishing a correspondence between said real resources at said 0 level of operation and said virtual resources at said level 1 of operation.

2. The apparatus of claim 1 wherein said register means includes means for identifying said virtual operating levels, said identifying means including virtual machine level identifiers, each identifier having a number of syllables corresponding to the respective number of the virtual operating level and wherein said register means also includes means for removing syllables from said identifiers for incrementing the level denoted by the identifier.

3. The apparatus of claim 1 wherein said mapping means includes an inter-level f-map, said correspondence-indicating means includes an intra-level $\phi$-map, and said correspondence-establishing means includes composer means for combining said f-map and said $\phi$-map.

4. The apparatus of claim 1 wherein said host computer also includes a virtual machine monitor operating at said 0 level, and wherein said apparatus also includes means for generating a first signal when said mapping means fails to map a virtual resource at a given level into the next higher virtual level and for transmitting said first signal directly to the virtual machine monitor controlling said next higher virtual level without the knowledge of the virtual machine monitor operating at said 0 level.

5. The apparatus of claim 4 also including means for generating a second signal when said correspondence-establishing means fails to establish correspondence between a virtual resource at said level 1 and a real resource at level 0 and for transmitting said second signal to said virtual machine monitor operating at the 0 level without the knowledge of any said virtual machine monitor controlling a virtual level.

* * * * *